United States Patent
Yamabe et al.

(10) Patent No.: US 10,438,577 B2
(45) Date of Patent: Oct. 8, 2019

(54) INFORMATION PROCESSING DEVICE AND INFORMATION PROCESSING SYSTEM

(71) Applicant: SONY CORPORATION, Tokyo (JP)

(72) Inventors: Yushi Yamabe, Tokyo (JP); Kyosuke Matsumoto, Kanagawa (JP); Kohei Asada, Kanagawa (JP); Jo Wada, Tokyo (JP); Satoshi Suzuki, Kanagawa (JP); Keiko Yabuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/763,977

(22) PCT Filed: Aug. 25, 2016

(86) PCT No.: PCT/JP2016/074782
§ 371 (c)(1),
(2) Date: Mar. 28, 2018

(87) PCT Pub. No.: WO2017/064929
PCT Pub. Date: Apr. 20, 2017

(65) Prior Publication Data
US 2018/0301135 A1    Oct. 18, 2018

(30) Foreign Application Priority Data
Oct. 16, 2015 (JP) .................. 2015-204227

(51) Int. Cl.
*G10K 11/178* (2006.01)
*G06F 3/0488* (2013.01)
(Continued)

(52) U.S. Cl.
CPC ........ *G10K 11/17823* (2018.01); *G06F 1/163* (2013.01); *G06F 3/04883* (2013.01);
(Continued)

(58) Field of Classification Search
CPC .. G06F 21/31–32; G06F 17/28; G06F 17/289; H04R 2430/01
(Continued)

(56) References Cited

U.S. PATENT DOCUMENTS 7,650,007 B2 * 1/2010 Iuliis .................. A45F 5/00
381/374
8,144,891 B2 * 3/2012 Her .................. H04R 25/00
381/151
(Continued)

FOREIGN PATENT DOCUMENTS

CN      101616351 A    12/2009
GB        2461143 A    12/2009
(Continued)

OTHER PUBLICATIONS

International Search Report and Written Opinion of PCT Application No. PCT/JP2016/074782, dated Nov. 1, 2016, 10 pages.

*Primary Examiner* — Disler Paul
(74) *Attorney, Agent, or Firm* — Chip Law Group

(57) ABSTRACT

Provided is an information processing device including: a holding section configured to hold a card that stores personal information; and a main body that is provided with the holding section and connectable to a strap section including a sound collection unit and an acoustic output unit, in which the main body encloses a sound signal processing unit configured to process a sound acquired at least by the sound collection unit and a processing unit configured to execute predetermined processing on a basis of the personal information stored in the card held by the holding section.

19 Claims, 16 Drawing Sheets

(51) Int. Cl.
*G06F 3/16* (2006.01)
*G06F 21/31* (2013.01)
*G06F 1/16* (2006.01)
*H04R 1/10* (2006.01)
*H04R 25/00* (2006.01)
*G06F 17/28* (2006.01)
*G10L 15/00* (2013.01)
*H04R 1/02* (2006.01)
*G06K 7/10* (2006.01)

(52) U.S. Cl.
CPC .............. *G06F 3/165* (2013.01); *G06F 21/31* (2013.01); *H04R 1/1041* (2013.01); *H04R 25/505* (2013.01); *G06F 17/28* (2013.01); *G06F 17/289* (2013.01); *G06K 7/10009* (2013.01); *G10K 2210/1081* (2013.01); *G10L 15/005* (2013.01); *H04R 1/028* (2013.01); *H04R 1/1016* (2013.01); *H04R 2225/61* (2013.01); *H04R 2430/01* (2013.01); *H04R 2460/07* (2013.01)

(58) Field of Classification Search
USPC ........ 381/71.6–71.7, 74, 77–82, 56–57, 106, 381/103; 235/380; 224/579
See application file for complete search history.

(56) References Cited

U.S. PATENT DOCUMENTS

| | | | | |
|---|---|---|---|---|
| 8,751,039 | B1* | 6/2014 | Macoviak | A61J 7/0076 700/244 |
| 8,983,843 | B2* | 3/2015 | Yoneyama | G01S 11/14 704/270 |
| 9,088,848 | B2* | 7/2015 | Abreu | G02C 3/003 |
| 9,368,118 | B2* | 6/2016 | Harada | G10L 25/78 |
| 9,427,071 | B2* | 8/2016 | Rayner | A45F 5/10 |
| 9,613,611 | B2* | 4/2017 | Ozluturk | G10K 11/175 |
| 9,716,939 | B2* | 7/2017 | Di Censo | H04R 1/1083 |
| 9,898,039 | B2* | 2/2018 | Moore | A61B 5/02438 |
| 2007/0040017 | A1* | 2/2007 | Kozlay | G06K 19/07354 235/380 |
| 2008/0047996 | A1* | 2/2008 | Blouin | A45C 11/18 224/579 |
| 2009/0323976 | A1 | 12/2009 | Asada et al. | |
| 2010/0206925 | A1* | 8/2010 | Fielding, Jr. | A45F 5/00 224/257 |
| 2010/0265084 | A1* | 10/2010 | Augustinowicz | G06K 19/005 340/686.6 |
| 2012/0095867 | A1* | 4/2012 | McKelvey | G06Q 20/322 705/26.41 |
| 2013/0248591 | A1* | 9/2013 | Look | G06K 19/06187 235/375 |
| 2014/0108011 | A1 | 4/2014 | Nishino et al. | |
| 2014/0162598 | A1* | 6/2014 | Villa-Real | H04M 1/66 455/411 |
| 2014/0294183 | A1* | 10/2014 | Lee | H04R 3/005 381/56 |
| 2015/0095063 | A1* | 4/2015 | Sherman | G09G 5/003 705/3 |
| 2015/0286873 | A1* | 10/2015 | Davis | G06F 3/00 382/103 |
| 2016/0127815 | A1* | 5/2016 | Ookuri | H04R 1/06 381/119 |

FOREIGN PATENT DOCUMENTS

| | | |
|---|---|---|
| JP | 10-304037 A | 11/1998 |
| JP | 2007-202089 A | 8/2007 |
| JP | 2008-293985 A | 12/2008 |
| JP | 2010-011117 A | 1/2010 |
| JP | 2010-146296 A | 7/2010 |
| JP | 2014-077736 A | 5/2014 |
| WO | 2013/168254 A1 | 11/2013 |

* cited by examiner

FIG. 13
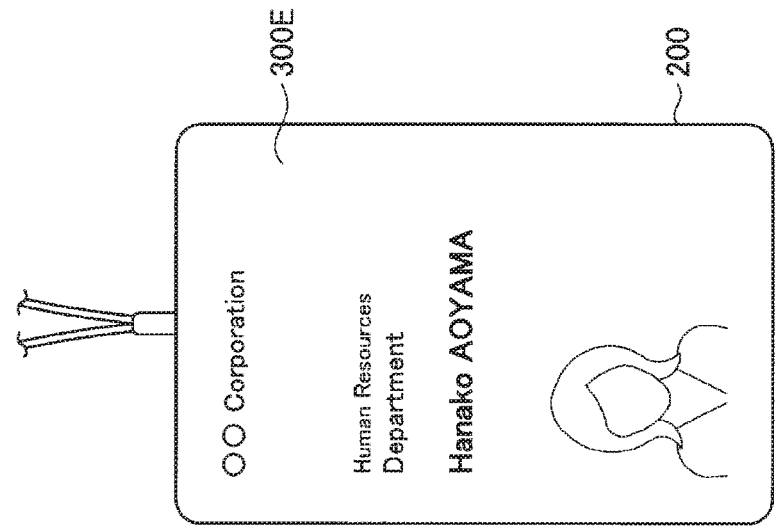
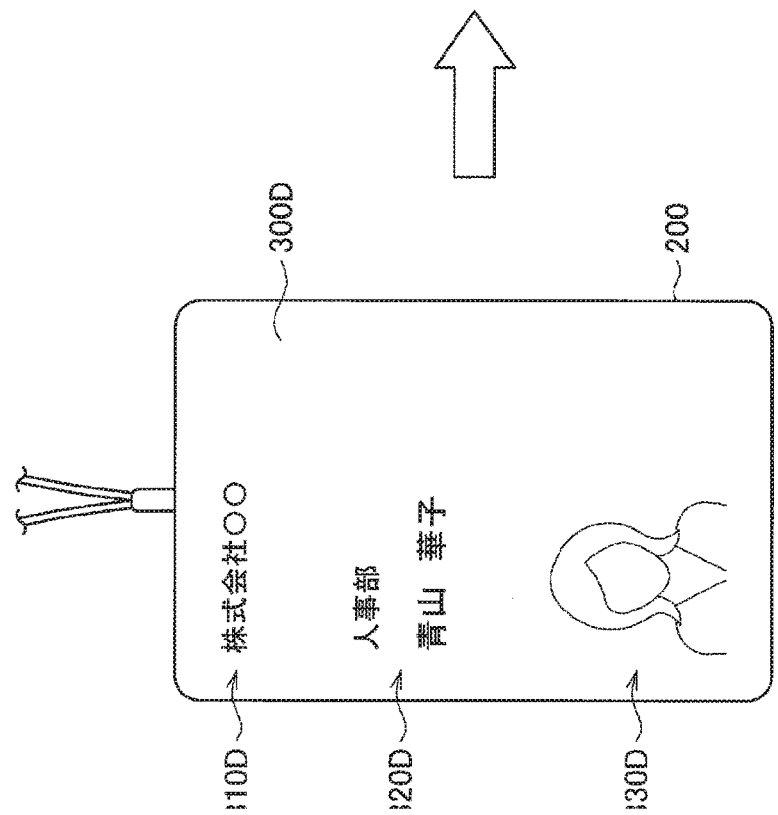

INFORMATION PROCESSING DEVICE AND INFORMATION PROCESSING SYSTEM

CROSS REFERENCE TO RELATED APPLICATIONS

This application is a U.S. National Phase of International Patent Application No. PCT/JP2016/074782 filed on Aug. 25, 2016, which claims priority benefit of Japanese Patent Application No. JP 2015-204227 filed in the Japan Patent Office on Oct. 16, 2015. Each of the above-referenced applications is hereby incorporated herein by reference in its entirety.

TECHNICAL FIELD

The present disclosure relates to an information processing device and an information processing system.

BACKGROUND ART

Conventionally, a sound collector (hereinafter, description will be made assuming that the sound collector also includes a hearing assist device and a hearing aid which is a medical device) equipped with a wide variety of functions by digital signal processing is commercially available, and is mainly used in a workplace or the like where the necessity of using the sound collector is high.

The sound collector is broadly classified into three types of ear-hole type, ear-hook type, and pocket type, and a combination with a mobile phone or the like is progressing. However, in order to achieve multiple functions by the combination with a mobile phone or the like, the ear-hole type and ear-hook type sound collectors require use of an ultra-low-power expensive dedicated device because of restrictions on battery size, which is a factor that pushes up the commercial price and hinders the sound collectors from becoming widespread. In addition, these sound collectors are largely subject to design constraints due to size reduction also in terms of wireless communication with an external device, UI, and sound quality.

On the other hand, since the pocket type sound collector is not subject to severe constraints on main body size, multiple functions are likely to be achieved. However, the pocket type sound collector is conspicuous since a cord leading to the main body and an acoustic device close to the ear is positioned on the front of the body when the main body is used in a pocket, and handling of the main body is troublesome. Therefore, like a mobile electronic device described in Patent Literature 1, for example, it is also possible to improve ease of use by using the main body in a manner hanged on the neck with hanging means to which an earphone and a microphone have been attached.

CITATION LIST

Patent Literature

Patent Literature 1: JP H10-304037A

DISCLOSURE OF INVENTION

Technical Problem

However, in a case of using the sound collector in a workplace, the main body of the sound collector is inevitably conspicuous. Therefore, there is a demand for a sound collector that is inconspicuous in business situations while being multifunctional.

Solution to Problem

According to the present disclosure, there is provided an information processing device including: a holding section configured to hold a card that stores personal information; and a main body that is provided with the holding section and connectable to a strap section including a sound collection unit and an acoustic output unit, in which the main body encloses a sound signal processing unit configured to process a sound acquired at least by the sound collection unit and a processing unit configured to execute predetermined processing on a basis of the personal information stored in the card held by the holding section.

Further, according to the present disclosure, there is provided an information processing system including: a strap section including a sound collection unit and an acoustic output unit; and an information processing device including a holding section configured to hold a card that stores personal information and a main body being provided with the holding section and connectable to the strap section, in which the main body of the information processing device encloses a sound signal processing unit configured to process a sound acquired at least by the sound collection unit and a processing unit configured to execute predetermined processing on a basis of the personal information stored in the card held by the holding section.

Further, according to the present disclosure, there is provided an information processing system including: a strap section that is capable of outputting authentication information that can specify a user and includes a sound collection unit and an acoustic output unit; and an information processing device including a main body that is connectable to the strap section, in which the main body of the information processing device encloses a sound signal processing unit configured to process a sound acquired at least by the sound collection unit and a processing unit configured to execute predetermined processing on a basis of the authentication information output from the strap section.

Advantageous Effects of Invention

According to the present disclosure as described above, a sound collector that is multifunctional and inconspicuous in business situations can be achieved. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 13 is an explanatory diagram showing a use case of the sound collection system according to the embodiment.

MODE(S) FOR CARRYING OUT THE INVENTION

Figure 1:
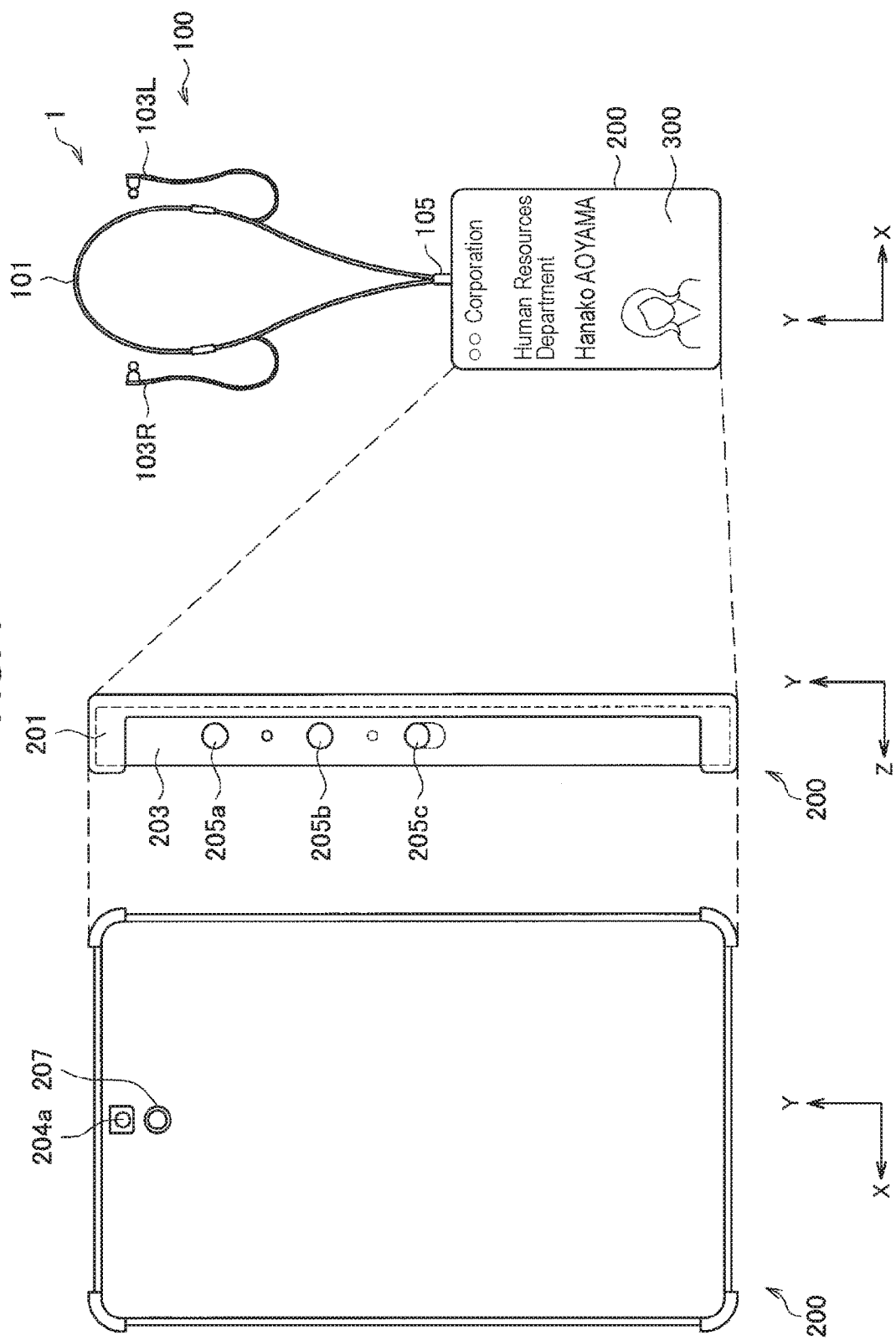
FIG. 1 shows an overall configuration diagram of a sound collection system according to an embodiment of the present disclosure, as well as a side view and a rear view of a main body.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Overview
2. System configuration
2.1. Overall configuration
2.2. Additional functions
(Acoustic profile setting)
(Written communication memorandum function)
2.3. Joining of strap section and main body
3. Functional configuration
3.1. Basic configuration
3.2. Application configuration (function enhancement of main body)
3.3. Application configuration (transmission and reception of information other than sound signal between strap section and main body)
4. Use cases
4.1. Change of display
4.2. Display/hiding
4.3. Automatic display
5. Hardware configuration <1. Overview>

First, a schematic configuration of a sound collection system according to an embodiment of the present disclosure will be described. The sound collection system according to the present embodiment is an information processing system in which a card holder that holds a radio frequency identifier (RFID) card (hereinafter, also simply referred to as a "card") or the like that stores personal information is provided with an acoustic signal processing function for a sound collector to allow the sound collector to be used integrally with the card. Such a sound collection system includes, for example, an information processing device including a sound signal processing unit of the sound collector integrated with the card and a strap section for a user to hang the information processing device on the neck, for example. The strap section includes, as the functions of the sound collector, a sound collection unit that acquires an external sound and a sound output unit that provides the user with a sound having been subjected to acoustic signal processing. In addition, the strap section is configured to be electrically and mechanically connectable to the information processing device, and an information signal such as a sound signal can be transmitted and received between the strap section and the information processing device.

Since such a sound collection system allows the information processing device including the acoustic signal processing function for the sound collector to be held integrally with the card held by a user in a manner hanged on the neck, there is no great difference in appearance from a case of hanging a card alone on the neck. In addition, since the acoustic signal processing function for the sound collector is provided for the main body of the information processing device, multiple functions are easily achieved. Accordingly, it is possible to provide a sound collector that is inconspicuous in business situations while being multifunctional. Hereinafter, a configuration and functions of the sound collection system according to the present embodiment will be described in detail.

<2. System Configuration>

[2.1. Overall Configuration]

Figure 2:
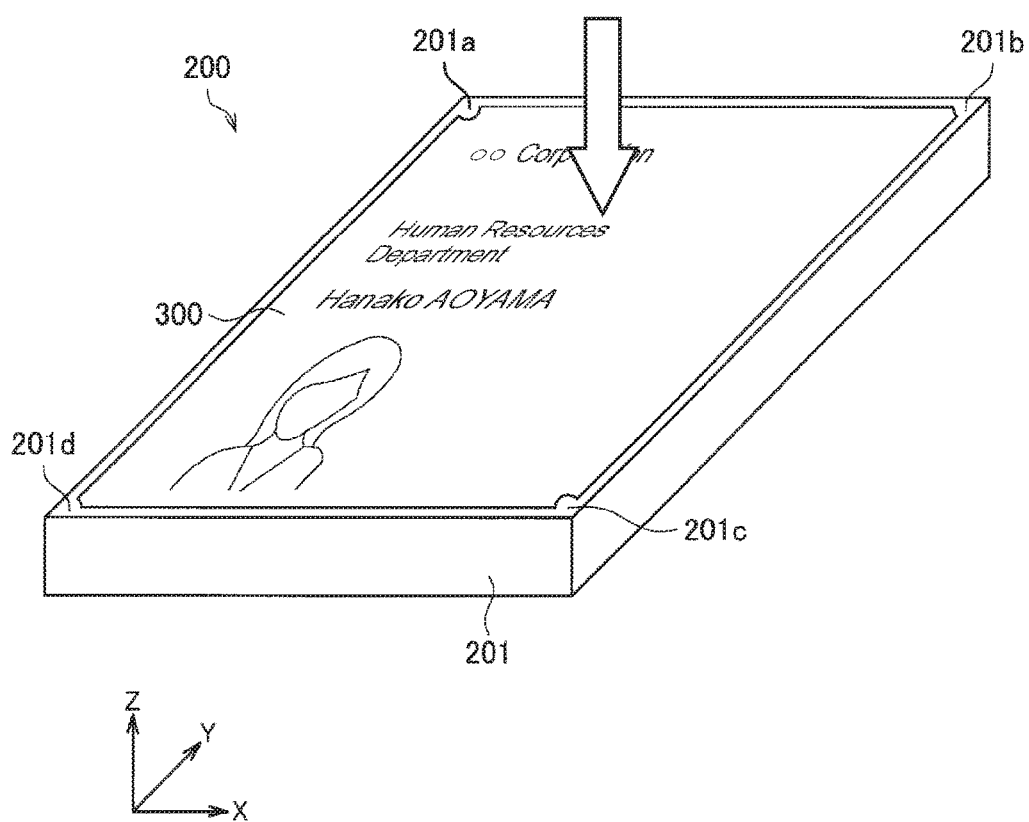
FIG. 2 is an explanatory diagram showing a case of fitting a card into the main body from above as an example of mounting a card on the main body according to the embodiment.
Figure 3:
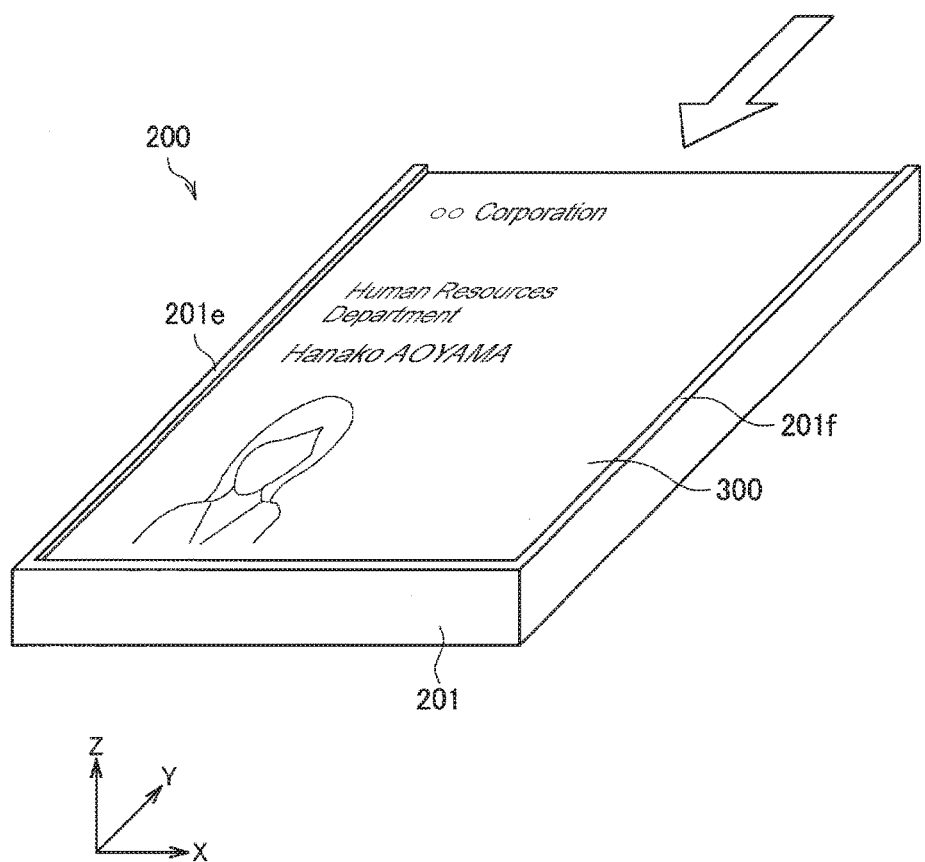
FIG. 3 is an explanatory diagram showing a case of inserting a card slidingly into the main body from one side as an example of mounting a card on the main body according to the embodiment.
Figure 4:
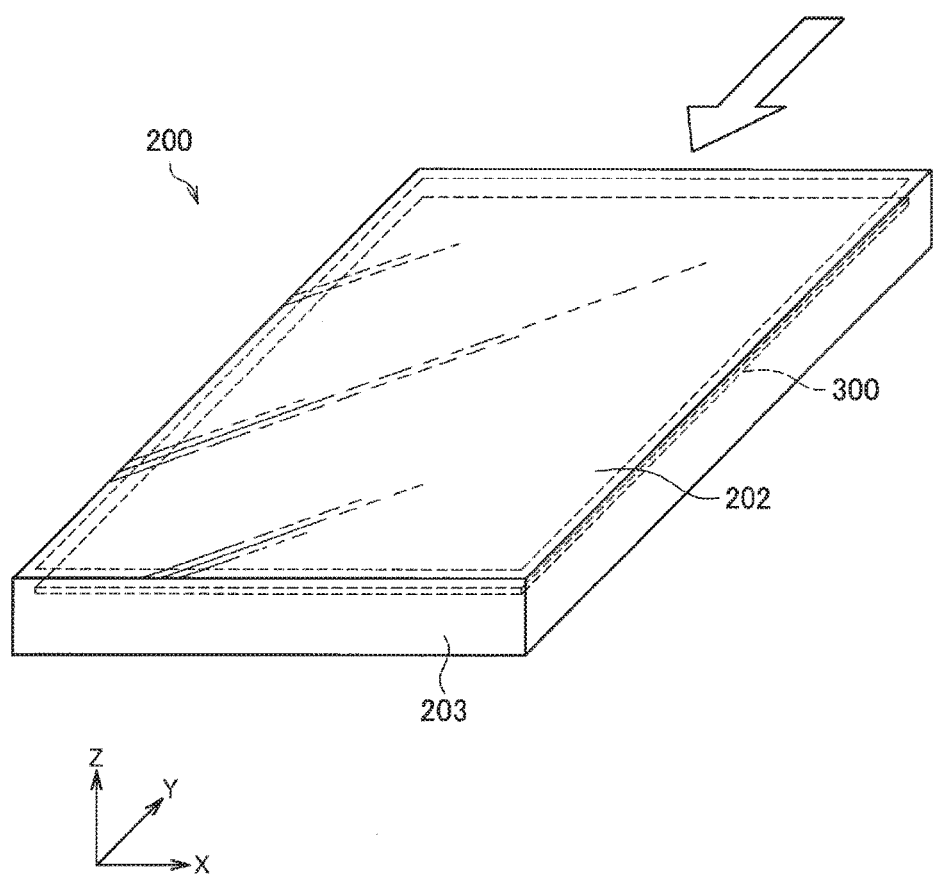
FIG. 4 is an explanatory diagram showing a case of inserting a card into the inside of the main body from one side as an example of mounting a card on the main body according to the embodiment.

First, on the basis of FIG. 1 to FIG. 4, an overall configuration example of a sound collection system 1 according to the present embodiment will be described. FIG. 1 shows an overall configuration diagram of the sound collection system 1 according to the present embodiment, as well as a side view and a rear view of a main body 200 equivalent to the information processing device. FIG. 2 to FIG. 4 are explanatory diagrams showing examples of mounting a card 300 on the main body 200 according to the present embodiment. Note that, in the present embodiment, a case in which the RFID card 300 is an employee ID card that stores personal information such as the name, company name, and belonging department will be described.

The sound collection system 1 according to the present embodiment includes a strap section 100 and the main body 200 that holds the card 300, as shown on the right side of FIG. 1.

(Strap Section)

The strap section 100 includes a strap 101, acoustic units 103R, 103L provided integrally with the strap 101, and a joint member 105 to be joined to the main body 200.

The strap 101 is a string member for a user to hang the main body 200 on the neck, and is not particularly limited in material, shape, or the like as long as the main body 200 can be held reliably. It is preferable that the strap 101 causes less user discomfort while being worn.

The acoustic units 103R, 103L are members used by a user in a manner mounted on the ears, and are configured to be usable in a manner connected to the main body 200 like an earphone, for example. The acoustic units 103R, 103L according to the present embodiment include a sound collection unit that acquires an external sound and a sound output unit that outputs a sound. The sound collection unit and the sound output unit are installed in an earphone to be mounted on an ear of the user, for example. The sound collection unit is a microphone, for example, and outputs an acquired sound signal to the main body 200. The sound output unit is a speaker, for example, and outputs a sound signal or the like processed in the main body 200 to the outside (user). That is, a sound entered the user's ears can be acquired by the acoustic units 103R, 103L, and can be converted into an appropriate sound signal in the main body 200 for output to the user. Note that the sound output unit may be a closed type or an open type.

The acoustic units 103R, 103L transmit and receive at least a sound signal to and from the main body 200. Thus, the acoustic units 103R, 103L and the main body 200 are electrically connected to the main body 200 via cables. These cables are arranged so as to partly pass through the strap 101, and the acoustic units 103R, 103L provided on one end side of the cables are provided so as to extend from some midpoint of the strap to the outside of the strap 101. The cables on the acoustic units 103R, 103L side extending from the strap 101 may be set at a length with such an allowance that can be mounted on the ears with no problem when the user hangs the strap 101 on the neck. On the other hand, the joint member 105 for connection to the main body 200 is provided on the other end side of the cables. This allows the acoustic units 103R, 103L to transmit and receive a sound signal to and from the main body 200 via the cables and the joint member 105.

The joint member 105 is a member for electrically and physically joining the strap section 100 and the main body 200. For example, the joint member 105 may be a plug capable of transmitting and receiving a signal. Examples of the plug capable of transmitting and receiving a signal include a multi-contact single-head plug which is a single plug having a plurality of terminals, and specifically, a 3.5-mm earphone plug or the like applies. Note that, in FIG. 1, joining to the main body 200 is made also physically by the joint member 105, whilst the present disclosure is not limited to such an example, but an electric joint and a physical joint may be configured by different members, as will be described later.

(Main Body)

The main body 200 is an information processing device that includes a holding section that holds the card 300 and encloses functional units that execute various types of information processing, and is configured as a card casing. For example, by making the main body 200 have a planar shape substantially identical to the card 300, it is possible to treat the main body 200 similarly to a general card casing as shown on the right side of FIG. 1, and the functional units can be made inconspicuous. The main body 200 may be configured such that an enclosure 203 that encloses the functional units is held by a casing 201 as shown at the center of FIG. 1, for example.

The holding section is provided for the casing 201 or the enclosure 203. The holding section is broadly divided into one that holds the mounted card 300 in a state exposed so as to be visible from the outside and one that holds the card 300 inserted into the inside of the main body 200.

Regarding the former, pressing sections 201a to 201d may be formed as holding sections at positions in the casing 201 that correspond to the four corners of a card installation surface of the enclosure 203, as shown in FIG. 2, for example. In this case, the card 300 is fitted into the main body 200 from above the card installation surface of the enclosure 203, and is held with the four corners of the card 300 pressed by the pressing sections 201a to 201d.

In addition, pressing sections 201e, 201f may be formed as holding sections along a pair of sides of the casing 201 as shown in FIG. 3, for example. In this case, a side surface of the casing 201 is open such that a card can be inserted, and the card 300 is inserted onto the card installation surface of the enclosure 203 from the opening. The pressing sections 201e, 201f are formed at positions corresponding to a pair of sides parallel to the insertion direction, and press and hold a pair of sides of the card 300 inserted onto the card installation surface. Note that the "card installation surface" will be hereinafter described as a "surface" of the main body 200.

On the other hand, regarding the latter, as shown in FIG. 4, for example, the card 300 is enclosed in the inside of the enclosure 203, and a panel 202 is provided on the card 300. The panel 202 may be, for example, a transparent plate-like member whose outer peripheral portion is held by the casing 201. In this case, it is possible to visually recognize the written contents of the card 300 inserted into the enclosure 203. Alternatively, the panel 202 may be a display that can display information. In this case, the written contents of the card 300 inserted into the enclosure 203 cannot be visually recognized from the outside, but it is also possible to read out information stored in the card 300 by the functional units enclosed in the enclosure 203 and to cause the read-out information to be displayed on the display. For example, it is possible to acquire information regarding the employee ID card from the information stored in the card 300, and to cause an image similar to the employee ID card described on the card 300 to be displayed on the display.

In addition, the panel 202 may be a transparent panel, and may be capable of displaying information on the panel in an overlaying manner. In this case, the written contents of the card 300 inserted into the enclosure 203 can be visually recognized through the panel 202, and by causing information to be displayed on the panel 202 according to necessity, different information can be displayed on the written contents of the card 300. Accordingly, for example, information not described on the employee ID card can also be newly added and displayed, and the written contents of the employee ID card can also be overwritten. In addition, a part or the whole of the written contents of the employee ID card can also be made as if they are hidden.

Further, the main body 200 may be provided with a touch sensor (not shown.) integrated on the panel 202. This allows a user to directly touch and operate information displayed on the panel 202 with a pen-type device, a finger, or the like.

The enclosure 203 of the main body 200 encloses a sound signal processing unit that performs sound signal processing for a sound acquired by the acoustic units 103R, 103L of the strap section 100, for example. In addition, the enclosure 203 encloses a system controller unit which is a processing unit that executes predetermined processing on the basis of personal information stored in the card 300 held by the holding section, for example. Note that detailed description of each functional unit enclosed in the main body 200 will be given later.

In addition, the enclosure 203 is provided with buttons 205a, 205b, a switch 205c, or the like for operating the main body 200, as shown at the center of FIG. 1. The buttons 205a, 205b may be power buttons, on/off operation buttons for the sound signal processing function, or the like, for example. In addition, in a case where the main body 200 includes a display, the buttons 205a, 205b may be on/off operation buttons for the display, or may be buttons for selecting or deciding the display contents of the display. Note that the configuration and the number of the buttons 205a, 205b and the switch 205c are not limited to those of the example shown at the center of FIG. 1, but can be changed as necessary.

Further, as shown on the left side of FIG. 1, a camera 207 may be provided on the rear surface of the enclosure 203. In addition, in the main body 200, for supplementary connection of the strap section 100 and the main body 200, an attachment hole 204a to which an attachment section (an attachment member 105a in FIG. 9) of the strap section 100 is to be attached may be formed in the vicinity of a joint section (a joint section 206 in FIG. 9) to which the joint member 105 of the strap section 100 is to be joined.

In addition, the main body 200 of the sound collection system 1 according to the present embodiment is configured to be capable of reading information stored in the card 300 held by the main body 200. The card 300 is a non-contact type IC card, and in a case where it is an employee ID card, for example, personal information such as the individual's name, company name, belonging department, and employee number is stored. On the other hand, the card installation surface of the main body 200 is provided with a reader-writer which is a wireless communication unit. Accordingly, it is possible to read information stored in the card 300 by the main body 200. Therefore, the sound collection system 1 according to the present embodiment is also capable of customizing various settings such as an acoustic profile, for example, on the basis of the personal information read from the card 300.

[2.2. Additional Functions]

The main body 200 of the sound collection system 1 can function as an employee ID card having the sound signal processing function, whilst it is also possible to further add functions to the main body 200.

(Acoustic Profile Setting)

Figure 5:
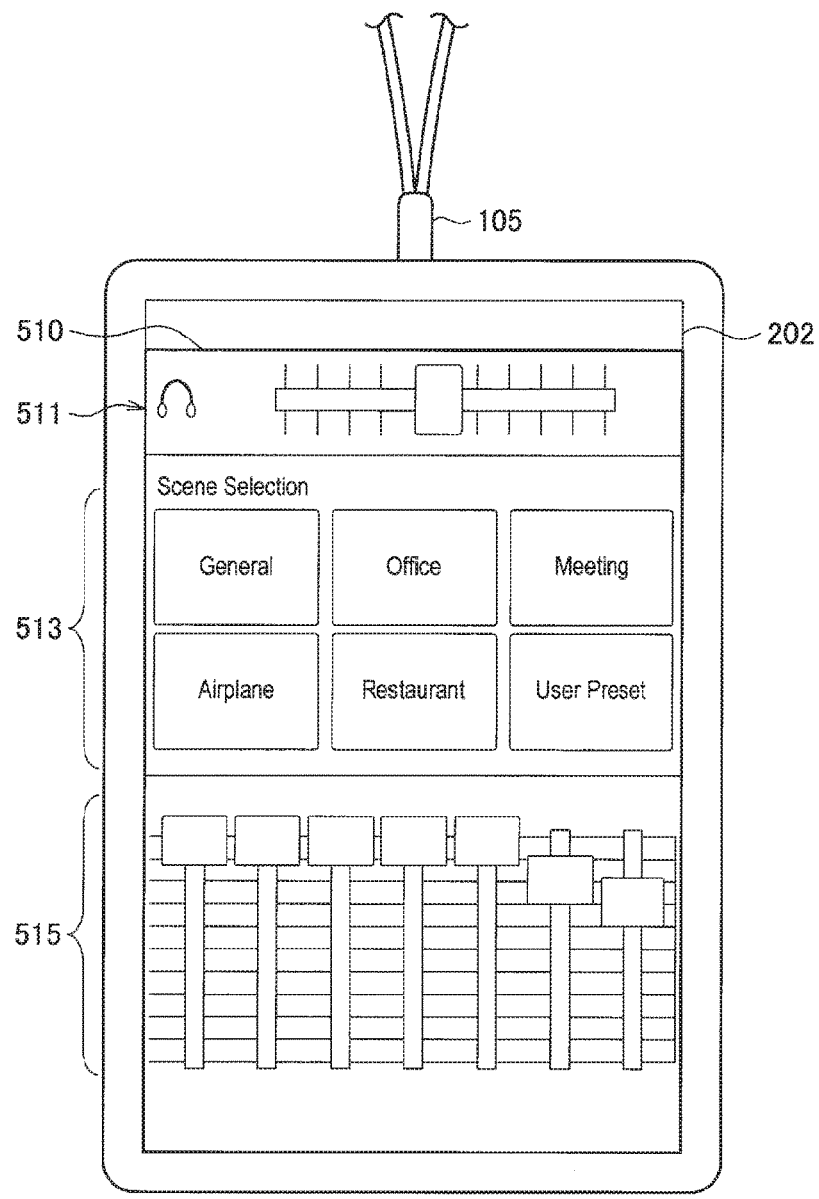
FIG. 5 is an explanatory diagram showing a state where an acoustic profile setting screen is displayed as an example of information displayed on a display of the main body according to the present embodiment.

For example, as shown in FIG. 5, the panel of the main body 200 may be caused to display an acoustic profile setting screen 510 for performing setting of the sound signal processing function. FIG. 5 is an explanatory diagram showing a state where the acoustic profile setting screen 510 is displayed as an example of information displayed on the panel of the main body 200 according to the present embodiment. The display of the acoustic profile setting screen 510 can be executed by operating the button 205a or the like, for example. By making it possible to display the acoustic profile setting screen 510 on the main body 200, an acoustic profile can be checked on a larger screen.

In addition, it is also possible to adjust the setting of the acoustic profile by operating the button 205a or the like, or in a case where the panel 202 is provided with a touch sensor, directly operating the panel 202. For example, as shown in FIG. 5, the acoustic profile includes a sound volume setting section 511 for setting a sound volume output from the acoustic units 103R, 103L of the strap section 100, a preset selection section 513 for selecting an acoustic profile previously set in accordance with a scene, and the like. In addition, in a setting section 515 for performing detailed setting of the acoustic profile, an acoustic profile of a scene selected by the preset selection section 513, for example, is displayed, and it is also possible to update the setting by operating the setting section 515.

(Written Communication Memorandum Function)

Figure 6:
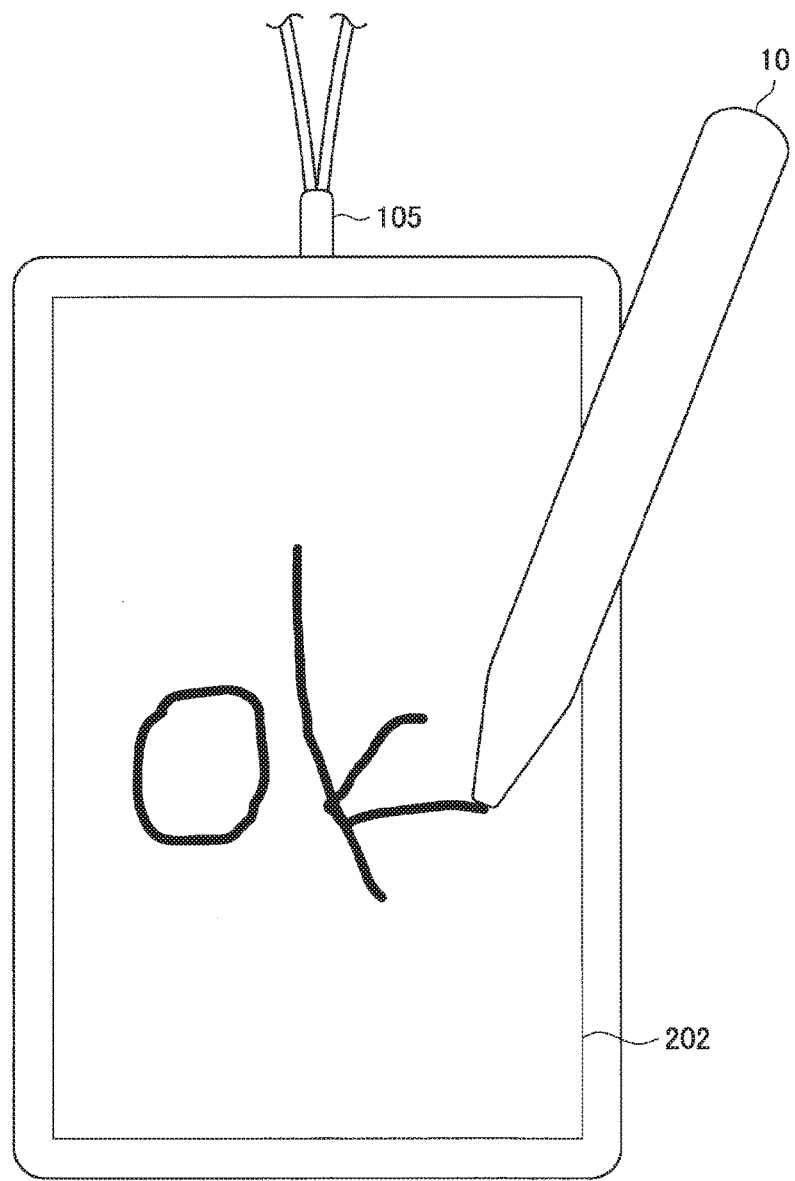
FIG. 6 is an explanatory diagram showing a case of using the display of the main body according to the present embodiment as a written communication memorandum.

In addition, as shown in FIG. 6, for example, it is also possible to use the panel 202 as a written communication memorandum. FIG. 6 is an explanatory diagram showing a case where the panel 202 of the main body 200 according to the present embodiment is used as a written communication memorandum. At this time, a touch sensor, for example, is provided on the panel 202, and by writing letters with a pen-type device 10 brought into contact with the panel 202, the letters are displayed on the panel 202 on the basis of a trajectory of positions at which the pen-type device 10 is in contact with the panel 202. By making it possible to utilize the main body 200 as a written communication memorandum in this manner, it is not necessary for a user to carry a memorandum separately.

Note that it has been described that the display of the acoustic profile setting screen 510 in FIG. 5 and the written communication memorandum in FIG. 6 are performed utilizing the panel 202 located on the front of the main body 200, whilst the present disclosure is not limited to such an example. For example, a display and a touch sensor may be provided on the rear surface of the main body 200. Accordingly, in a state where the function as an employee ID card is maintained, and even in a case where the panel 202 is not provided on the card installation surface, the above-described function can be utilized.

In addition, additional functions to the sound collection system 1 are not limited to the above-described examples, but a function of assisting a conversation in a foreign language may be provided, for example. That is, it is also possible to achieve a function of, in a case where a foreign language is input by the sound collection unit of the strap section 100, translating the input foreign language into the user's native language by the functional unit of the enclosure 203 for output from the sound output unit. Note that further additional functions of the sound collection system 1 according to the present embodiment will be described in the following use cases.

[2.3. Joining of Strap Section and Main Body]

Figure 7:
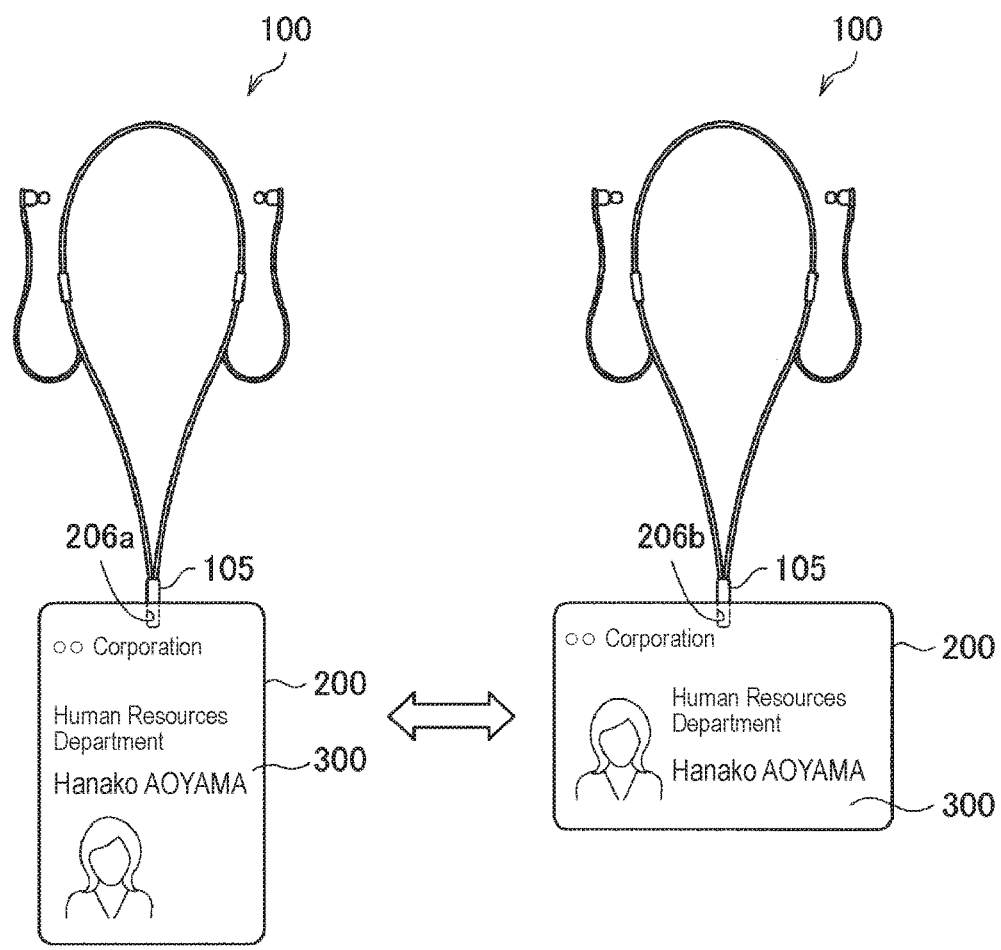
FIG. 7 is an explanatory diagram showing states where a strap section has been attached in accordance with the orientation of a card.
Figure 8:
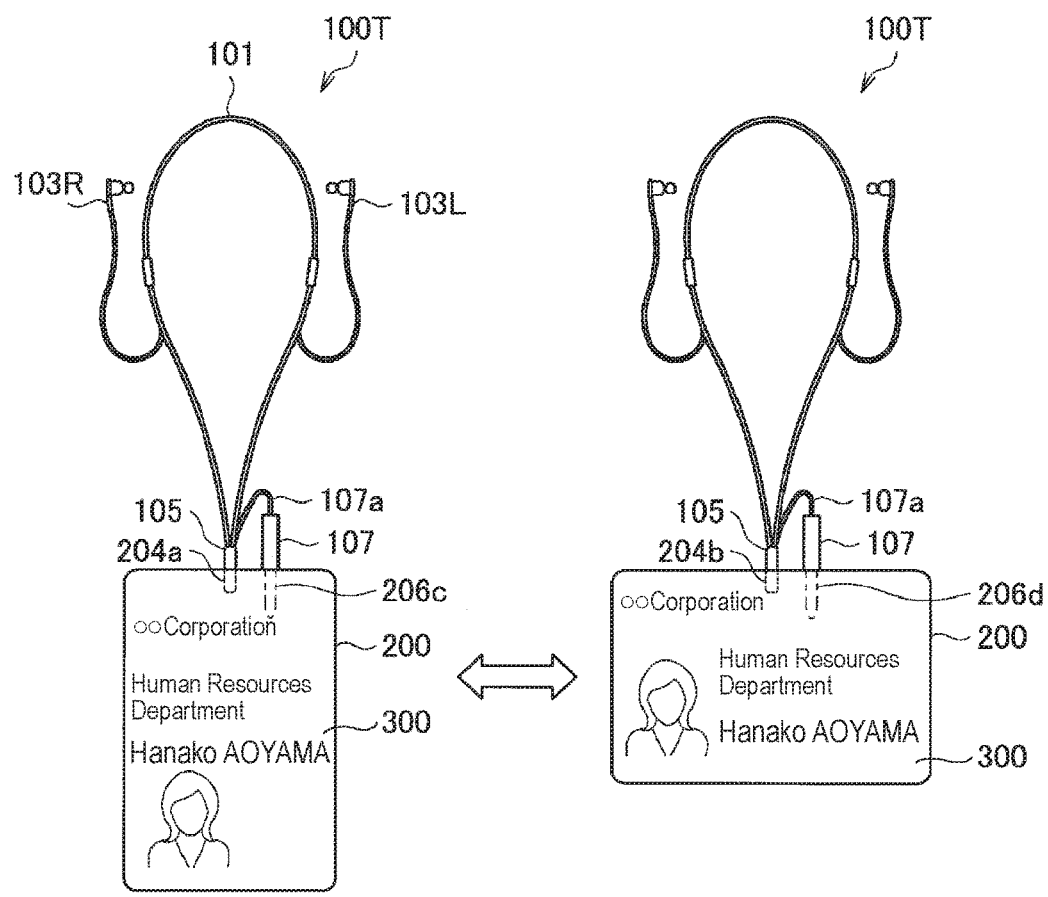
FIG. 8 is an explanatory diagram showing states where a card has been attached in different orientations to a strap section in which a joint member is separate from a strap.
Figure 9:
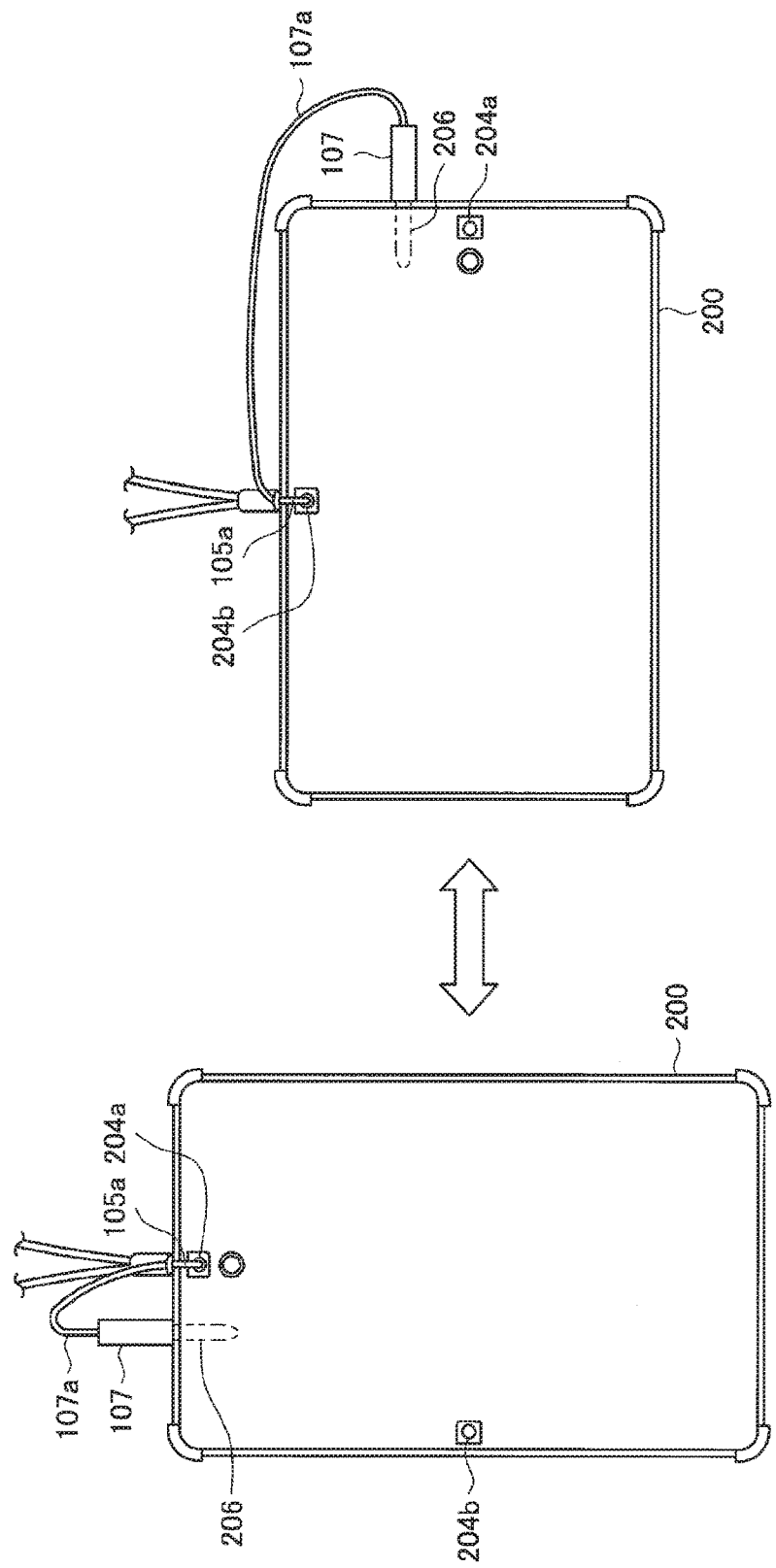
FIG. 9 is an explanatory diagram showing examples of connection between the strap section and the main body in a case where the main body is provided with two attachment holes to which a holding section of the strap can be attached.

The sound collection system 1 according to the present embodiment uses the main body 200 that holds an employee ID card (the card 300) and the strap section 100 in a joined manner. Here, the employee ID card includes a vertical type and a horizontal type in accordance with the orientation of written contents of the card. FIG. 7 to FIG. 9 show joining examples of the strap section 100 and the main body 200. Note that FIG. 7 is an explanatory diagram showing states where the strap section 100 has been attached in accordance with the orientation of the card 300. FIG. 8 is an explanatory diagram showing states where the card 300 has been attached at different orientations to a strap section 100T in which a joint terminal 107 is separate from the strap 101. FIG. 9 is an explanatory diagram showing examples of connection between the strap section 100T and the main body 200 in a case where the main body 200 is provided with the two attachment holes 204a, 204b to which the holding section of the strap 101 can be attached.

First, FIG. 7 shows a case where the strap section 100 shown in FIG. 1 is used. In this case, the strap section 100 and the main body 200 are joined by the joint member 105 of the strap section 100 and the joint section 206 (206a, 206b) of the main body 200. At this time, in a case of a vertical type employee ID card as shown on the left side of FIG. 7, the joint member 105 of the strap section 100 may be joined to the joint section 206a located on the shorter side of the main body 200. In addition, in a case of a vertical type employee ID card as shown on the right side of FIG. 7, the joint member 105 of the strap section 100 may be joined to the joint section 206b located on the longer side of the main body 200. In this manner, merely by selecting the joint section 206 (206a, 206b) of the main body 200 to which the joint member 105 of the strap section 100 is to be joined in accordance with the orientation of the employee ID card, a user can similarly utilize various functions that can be carried out in the sound collection system 1.

In addition, as shown in FIG. 8, in the strap section 100T, the joint member 105 may be separated into an attachment member that physically holds the main body 200 and the joint terminal 107 that makes electric connection with the main body 200. In this case, as shown on the left side of FIG. 8, by providing the attachment hole 204a for attaching the attachment member and a joint section 206c to which the joint terminal 107 is to be joined on the shorter side of the main body 200, the vertical type employee ID card can be handled. On the other hand, as shown on the right side of FIG. 8, by providing the attachment hole 204b for attaching the attachment member and a joint section 206d to which the joint terminal 107 is to be joined on the longer side of the main body 200, the horizontal type employee ID card can be handled.

The examples of FIG. 7 and FIG. 8 are configured such that the joining position for the joint terminal 107 of the strap section 100 can also be changed in accordance with the orientation of the employee ID card, whilst only a single joint section 206 of the main body 200 may be configured as shown in FIG. 9, for example. In the example of FIG. 9, the joint section 206 is formed on one shorter side of the main body 200 in agreement with the orientation of the main body 200 in a case of holding the vertical type employee ID card. Therefore, in a case of joining the main body 200 that holds the vertical type employee ID card and the strap section 100T, the attachment member 105a is attached to the attachment hole 204a provided on the shorter side of the main body 200, and the joint terminal 107 is joined to the joint section 206, as shown on the left side of FIG. 9, similarly to the left side of FIG. 8.

On the other hand, in a case of joining the main body 200 that holds the horizontal type employee ID card and the strap section 100T as shown on the right side of FIG. 9, the attachment member 105a is attached to the attachment hole 204b provided on the longer side of the main body 200, but the joint terminal 107 is joined to the joint section 206 on the shorter side. In this case, the distance from a section to which the attachment member 105a is attached (that is, the root of the strap 101 and a section from which a cable 107a of the joint terminal 107 extends) to the joint section 206 on the shorter side is longer than in the case of holding the vertical type employee ID card. Therefore, it is necessary to make it possible to set the cable 107a of the joint terminal 107 to be longer so as to be capable of handling either case where the orientation of the employee ID card is vertical or horizontal.

Here, in a case where the cable 107a is set longer in order that the joint terminal 107 can be joined to the main body 200 also in the case of using the horizontal type employee ID card, the cable 107a is slackened in the case of using the vertical type employee ID card. Therefore, a groove in which the cable 107a can be embedded may be formed in a part of the main body 200, such as a side surface of the casing 201 of the main body 200 or the rear surface of the enclosure 203, for example, to embed a slack and dangling portion of the cable 107a in the groove. Alternatively, the cable 107a of the joint terminal 107 may be configured to be capable of being retracted and housed within the strap 101. In this case, it is possible to pull out the cable 107a of the joint terminal 107 from the strap 101 by a necessary length to prevent the cable 107a from being slackened. By providing one joint section 206 of the main body 200 as in FIG. 9, the main body 200 can have a simpler configuration.

Note that the number and position of joint sections and attachment holes formed in the main body 200 are not limited to the examples shown in FIG. 7 to FIG. 9, but can be set as appropriate. For example, as shown in FIG. 7 and FIG. 8, in a case where the main body 200 is provided with a plurality of joint sections, it is also possible to join only a microphone, which is a sound collection unit, to one joint section and join only an earphone (speaker), which is a sound output unit, to another joint section to achieve the function as a sound collector.

<3. Functional Configuration>

Next, on the basis of FIG. 10 to FIG. 12, a functional configuration example of the sound collection system 1 according to the present embodiment will be described.

[3.1. Basic Configuration]

Figure 10:
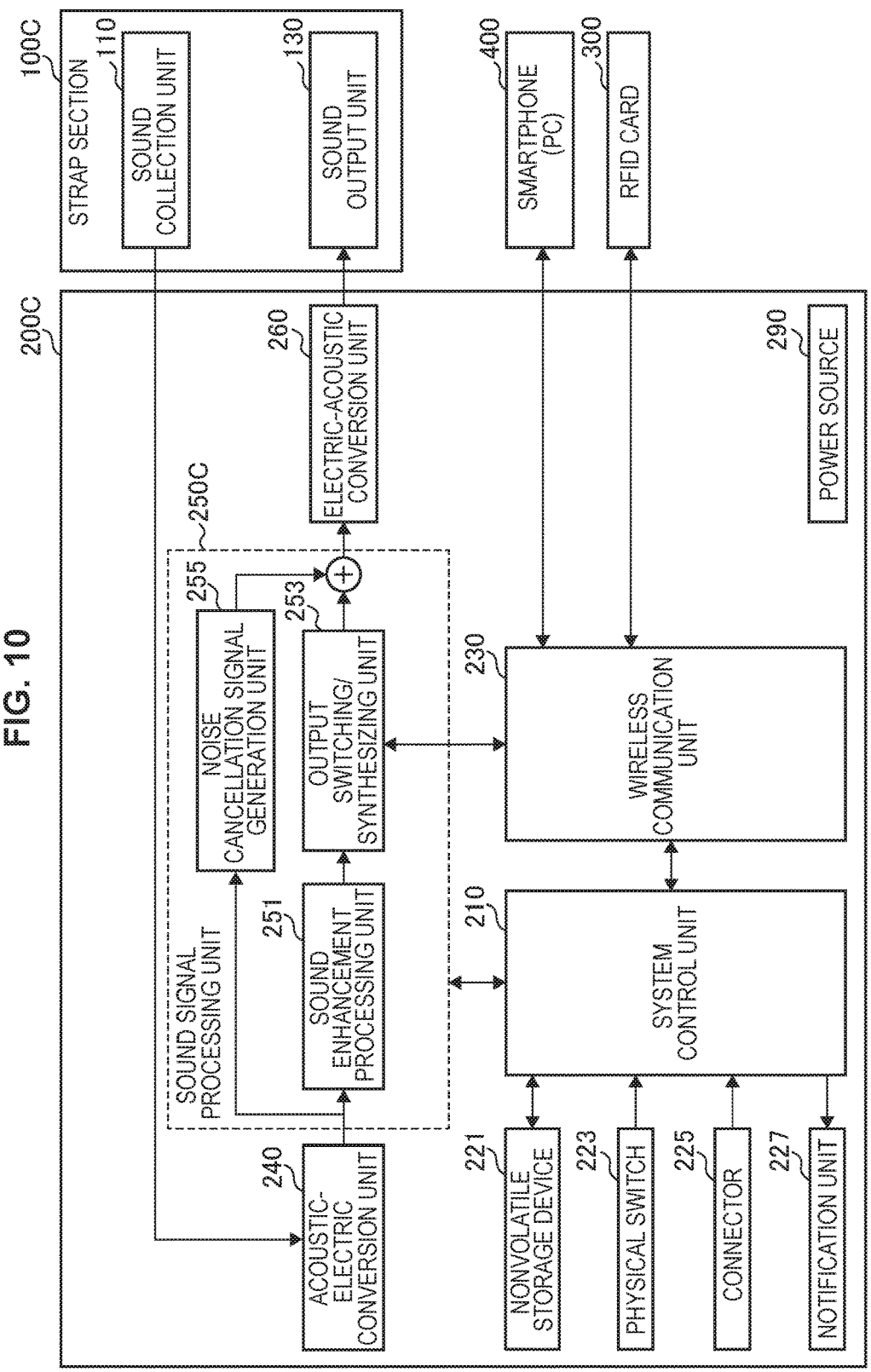
FIG. 10 is a functional block diagram showing a basic configuration of the sound collection system according to the embodiment.

FIG. 10 shows a basic configuration of the sound collection system 1 according to the present embodiment. As shown in FIG. 10, the sound collection system 1 includes a strap section 100A, a main body 200A, and the RFID card 300. Note that the main body 200A can also communicate with an external device 400 such as a smartphone or a PC.

(Strap Section)

The strap section 100A includes a sound collection unit 110 and a sound output unit 130. The sound collection unit 110 is a microphone or the like, for example, and transmits an acquired sound source to the main body 200A. The sound output unit 130 is a functional unit that outputs a sound, such as an earphone, for example, and outputs a sound on the basis of a sound signal having been subjected to sound signal processing in the main body 200A.

(Main Body)

The main body 200A includes a system control unit 210, a nonvolatile storage device 221, a physical switch 223, a connector 225, a notification unit 227, a wireless communication unit 230, an acoustic-electric conversion unit 240, a sound signal processing unit 250, and an electric-acoustic conversion unit 260, as shown in FIG. 10. Note that the main body 200A includes a power source 290 as a power supply unit that causes each functional unit to function.

The system control unit 210 is a processing unit that controls various functions of the main body 200A. For example, the system control unit 210 receives an operation input for operating the main body 200A input by the physical switch 223 or the like, and causes corresponding processing to be executed, and causes the wireless communication unit 230 to function to cause information to be acquired from the card 300 held by the main body 200A. In addition, it is also possible for the system control unit 210 to set the setting of the sound signal processing unit 250 (that is, an acoustic profile) again on the basis of personal information acquired from the card 300. It is also possible for the system control unit 210 to perform management of the usage status of the power source 290 or the like.

The nonvolatile storage device 221 is a storage unit that stores information, and includes, for example, a read only memory (ROM), a flash memory, a hard disk drive, or the like. In the nonvolatile storage device 221, a sound source acquired by the sound collection unit 110 of the strap section 100A, for example, may be stored. Note that a sound source may be recorded in the nonvolatile storage device 221 by either system of monaural recording and stereo recording. In addition, recording may be performed by a binaural recording system that records under the same condition as in a situation where a human actually perceives a sound.

The physical switch 223 is a functional unit for performing an operation input for operating the main body 200A. For example, the buttons 205a, 205b, the switch 205c, and the like shown at the center of FIG. 1 correspond to the physical switch 223. An operation input from the physical switch 223 is output to the system control unit 210.

The connector 225 is an interface unit for connecting the main body 200A and an external device such that information can be transmitted and received. The connector 225 may be a universal serial bus (USB) or the like, for example.

The notification unit 227 is a functional unit for notifying information to the outside from the main body 200A, and may be a light emitting device such as a LED, for example. Notification of the notification unit 227 is controlled by the system control unit 210. For example, while sound signal processing of a sound source acquired in the sound collection unit 110 of the strap section 100A is being executed, the main body 200A may perform something like causing a green LED included in the notification unit 227 to flash. In addition, in a case where the available capacity of the nonvolatile storage device 221 becomes a predetermined value or smaller, for example, the main body 200A may perform something like turning on a red LED included in the notification unit 227.

The wireless communication unit 230 is a functional unit that enables wireless communication with the card 300, the smartphone 400, or the like, and achieves a wireless communication technology, such as Bluetooth (registered trademark), near field communication (NFC), or wifi, for example. The wireless communication unit 230 is capable of reading out information stored in the card 300, and transmitting and receiving information to and from an external device such as the smartphone 400. Communication made by the wireless communication unit 230 allows an acoustic profile edited in the smartphone 400, for example, to be received by the main body 200A, and allows update information regarding various programs for executing the respective functions included in the main body 200A to be received from a PC or the like.

The acoustic-electric conversion unit 240, the sound signal processing unit 250, and the electric-acoustic conversion unit 260 correspond to one function of the sound collector.

The acoustic-electric conversion unit 240 converts a sound source acquired by the sound collection unit 110 of the strap section 100A into a digital sound signal for output to the sound signal processing unit 250.

The sound signal processing unit 250 is a functional unit that generates a sound signal to be output from the sound output unit 130 of the strap section 100A, and includes a sound enhancement processing unit 251, an output switching/synthesizing unit 253, and a noise cancellation signal generation unit 255. Note that the noise cancellation signal generation unit 255 may not necessarily be provided.

The sound enhancement processing unit 251 analyzes a digital sound signal, and makes an adjustment on the basis of an acoustic profile of a user who uses the sound collection system 1. For example, processing such as equalizer setting processing for changing frequency characteristics of a sound signal, dynamic range control, noise reduction, howling canceller, and directivity control (beam forming) is performed. The digital sound signal processed by the sound enhancement processing unit 251 is output to the output switching/synthesizing unit 253.

The output switching/synthesizing unit 253 performs switching or synthesis of a sound signal to be output from the sound output unit 130 of the strap section 100A. For example, the output switching/synthesizing unit 253 causes the digital sound signal processed by the sound enhancement processing unit 251 not to be output from the sound output unit 130 on the basis of an acoustic profile.

The noise cancellation signal generation unit 255 generates a cancellation signal for cancelling out noise such as noise included in a sound source. For example, the noise cancellation signal generation unit 255 turns noise included in a sound source into a digital signal, and generates an antiphase sound that cancels out the noise as a cancellation signal.

The sound signal processing unit 250 synthesizes the digital sound signal output from the output switching/synthesizing unit 253 and the cancellation signal generated by the noise cancellation signal generation unit 255 for output to the electric-acoustic conversion unit 260.

The electric-acoustic conversion unit 260 converts the digital sound signal processed in the sound signal processing unit 250 into a sound for output to the sound output unit 130 of the strap section 100A.

(RFID Card)

The RFID card 300 is a card including an RF tag that stores user's personal information and the like. Information stored in the card 300 can be read by the wireless communication unit 230 of the main body 200A, for example. Note that it is also possible to transmit information from the main body 200A to the card 300 via the wireless communication unit 230 to update information stored in the card 300.

[3.2. Application Configuration (Function Enhancement of Main Body)]

In the sound collection system 1 according to the present embodiment, since the main body 200 can be provided with an information processing function, it is possible to mount a plurality of sensors and memories on the main body 200 as compared with a conventional sound collector. This allows many functions to be executed in the sound collection system 1. Hereinafter, on the basis of FIG. 11, a functional configuration example in which a plurality of sensors are included in a main body 200B will be described as an application configuration of the sound collection system 1 according to the present embodiment.

Figure 11:
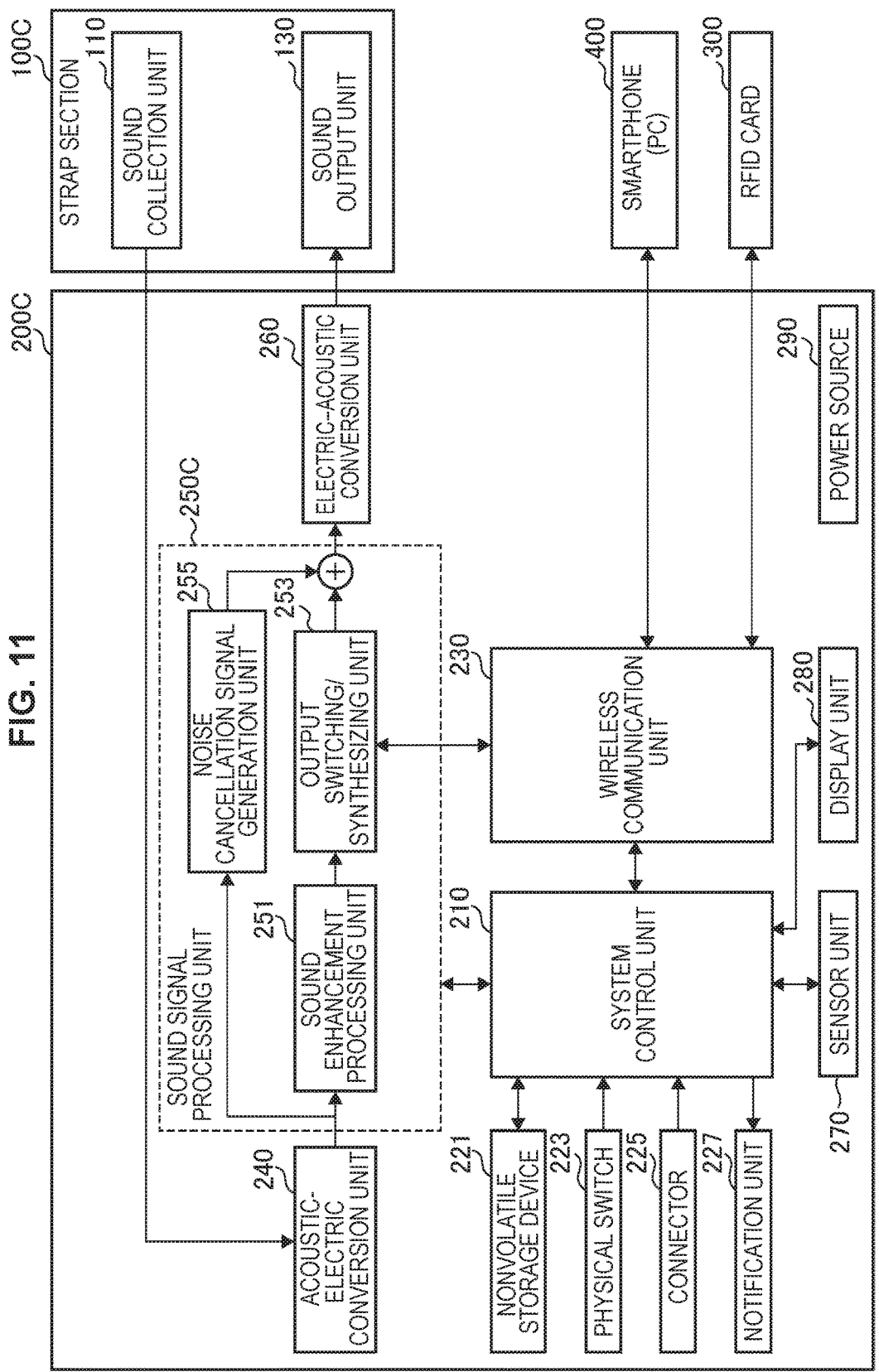
FIG. 11 is a functional block diagram showing a functional configuration example in which a plurality of sensors are provided for the main body as an application configuration of the sound collection system according to the embodiment.

As shown in FIG. 11, the sound collection system 1 includes the strap section 100A, the main body 200B, and the RFID card 300. Note that the main body 200B is also capable of communicating with the external device 400 such as a smartphone or a PC. As compared with the sound collection system 1 of FIG. 10, the sound collection system 1 shown in FIG. 11 is different only in that the main body 200B is provided with a sensor unit 270 and a display unit 280. Therefore, description of functional configuration identical to that of FIG. 10 is omitted here, and matters concerning the sensor unit 270 and the display unit 280 of the main body 200B will be mainly described.

The sensor unit 270 of the main body 200B includes one or more sensors for acquiring information concerning a user who utilizes the sound collection system 1. The sensor unit 270 may be, for example, a gyro sensor, a GPS sensor, a camera, or the like. Sensor information acquired by the sensor unit 270 is output to the system control unit 210. The system control unit 210 can cause various functions of the sound collection system 1 to be executed on the basis of the sensor information received from the sensor unit 270.

For example, by using sensor information of a camera, a GPS sensor, or the like, it is possible to save a conversation together with a conversation partner and location information, such as "with whom" and "where" a conversation has been made. In addition, by incorporating a camera in the main body 200B, it is also possible to adaptively form directivity of a sound upon recognizing the conversation partner. Further, it is also possible to change the setting of an acoustic profile using sensor information of a gyro sensor or a GPS sensor. For example, on the basis of these pieces of sensor information, it is possible to recognize an action such as a user sitting in the office or standing and walking. The acoustic profile may be changed to an appropriate value in accordance with the result of this action recognition. In addition, it is also possible to grasp a rotation state of the main body 200B by sensor information of a gyro sensor or a GPS sensor. Therefore, when the acoustic profile setting screen is displayed on the panel, for example, the preset of each scene of the acoustic profile may be caused to be switched in accordance with the rotation of the main body 200B.

Note that these sensor units may acquire sensor information acquired by a sensor unit provided in an external device such as the smartphone 400 via the wireless communication unit 230 and may use the sensor information. By making the wireless communication unit 230 adaptable to many wireless standards such as RFID, Bluetooth (registered trademark), and wifi, a more advanced function can be provided in the sound collection system 1 while preparing a connection procedure.

The display unit 280 is an output unit capable of displaying information, and may be, for example, a liquid crystal display device, an OLED device, or the like. In addition, a touch sensor may be provided by being integrated on the display unit 280. Accordingly, as shown in FIG. 5 or FIG. 6, for example, it is possible to directly operate information displayed on the display unit 280 and to input information.

In this manner, by providing the main body 200B with the sensor unit 270 or the display unit 280, it is possible to provide various functions in the sound collection system 1.

[3.3. Application Configuration (Transmission and Reception of Information Other than Sound Signal Between Strap Section and Main Body)]

As another application configuration example of the sound collection system 1 according to the present embodiment, it is also possible that information other than a sound signal can be transmitted and received between the strap section 100 and the main body 200. Accordingly, for example, it is possible to acquire user's biometric information in the strap section 100 or to vibrate the strap section 100 to take action for a user, and it is possible to execute many functions in the sound collection system 1. Hereinafter, a functional configuration example capable of transmitting and receiving information other than a sound signal between the strap section and the main body will be described on the basis of FIG. 12, as an application configuration of the sound collection system 1 according to the present embodiment.

Figure 12:
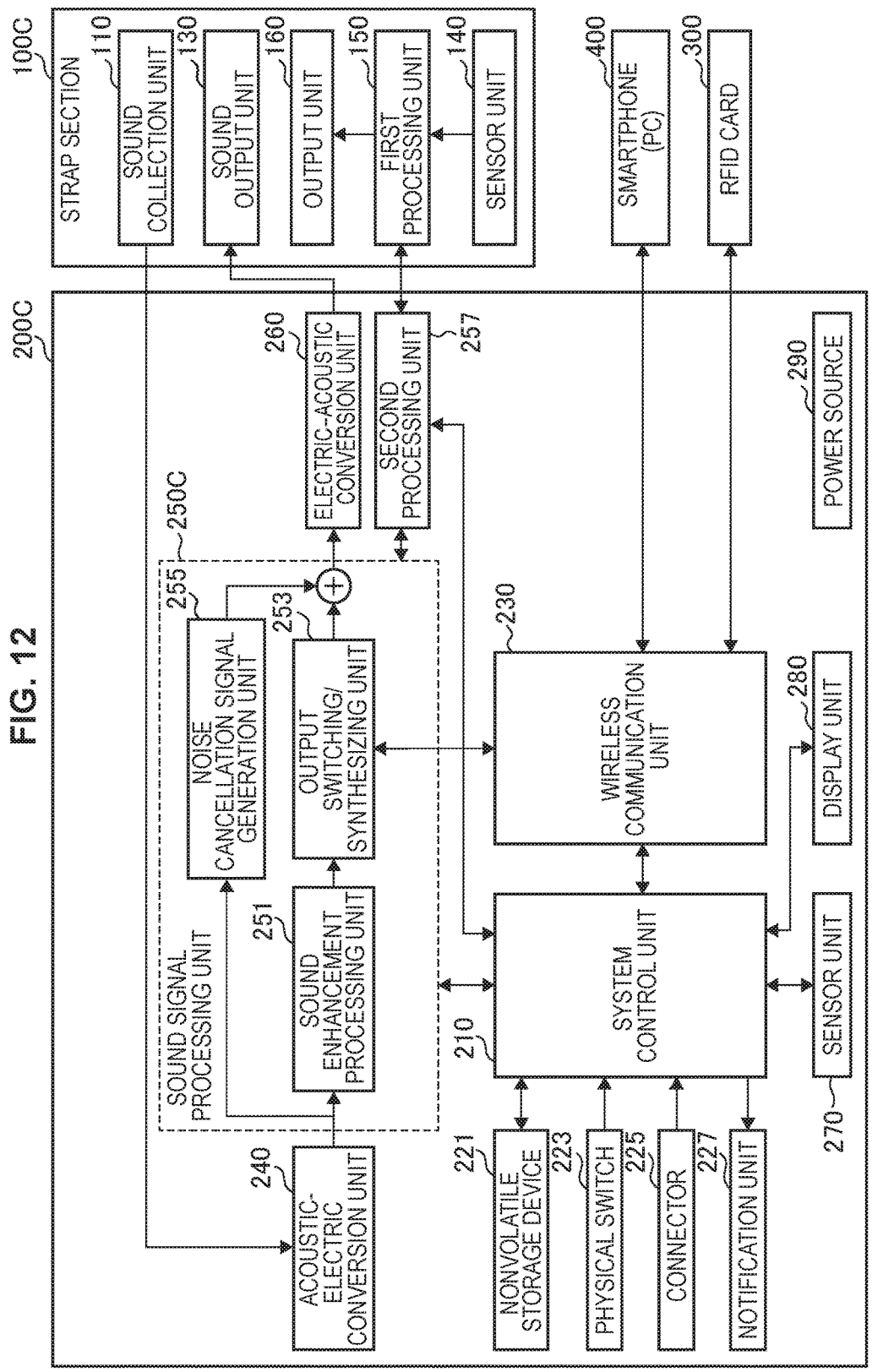
FIG. 12 is a functional block diagram showing a functional configuration example capable of transmitting and receiving information other than a sound signal between the strap section and the main body as another application configuration of the sound collection system according to the embodiment.

As shown in FIG. 12, the sound collection system 1 includes a strap section 100C, a main body 200C, and the RFID card 300. Note that the sound collection system 1 is also capable of communicating with the RFID card 300 and the external device 400 such as a smartphone or a PC. As compared with the sound collection system 1 of FIG. 11, the sound collection system 1 shown in FIG. 12 is different in that the strap section 100C is newly provided with a sensor unit 140, a first processing unit 150, and an output unit 160, and that the main body 200C is newly provided with a second processing unit 257. Therefore, description of functional configuration identical to that of FIG. 11 is omitted here, and matters concerning the sensor unit 140, the first processing unit 150, and the output unit 160 of the strap section 100C and the second processing unit 257 of the main body 200C will be mainly described.

(Strap Section)

The strap section 100C according to the present embodiment further includes the sensor unit 140, the first processing unit 150, and the output unit 160 in addition to the sound collection unit 110 and the sound output unit 130. The sensor unit 140 includes one or more sensors capable of acquiring information concerning the user. That is, in the strap section 100C, information concerning the user can be acquired by the sensor unit 140, and acquired sensor information can be transmitted to the main body 200C by the first processing unit 150. In addition, the strap section 100C is capable of acquiring information other than a sound from the main body 200C by the first processing unit 150, and is also capable of outputting predetermined information from the output unit 160 on the basis of the acquired information.

The sensor unit 140 may be a biometric information sensor capable of acquiring biometric information such as the heart rate or body temperature, for example. In addition, as the sensor unit 140, a proximity sensor that measures the distance to the user may be provided. Information acquired by the sensor unit 140 is output to the main body 200C via the first processing unit 150.

The first processing unit 150 performs predetermined processing for outputting predetermined information from the strap section 100C to the main body 200C. The first processing unit 150 is configured to be capable of transmitting and receiving information to and from the second processing unit 257 of the main body 200C. The first processing unit 150 performs predetermined processing on information or the like acquired by the sensor unit 140 to obtain information that can be transmitted to the main body 200C. For example, the first processing unit 150 may perform processing of multiplexing predetermined information, and may perform processing of converting information received from the main body 200C into information that can be output from the output unit 160.

Transmission and reception of information between the first processing unit 150 of the strap section 100C and the second processing unit 257 of the main body 200C can specifically be executed by connection between a joint member of the strap section 100C and a joint section of the main body 200C. The joint member of the strap section 100C is a multi-contact single-head plug including a plurality of terminals, for example, as described above, and one terminal among the plurality of terminals is configured to be capable of transmitting and receiving a multiplexed signal. For example, the multi-contact single-head plug is capable of transmitting and receiving information or the like processed in the sound collection unit 110, the sound output unit 130, and the first processing unit 150. Part of information to be transmitted or received by the multi-contact single-head plug may have been multiplexed.

In addition, the joint section of the main body 200C to which the multi-contact single-head plug is to be joined is also configured as a multi-contact jack in correspondence to the joint member. The joint section is configured to be capable of transmitting and receiving a multiplexed signal via one terminal among the plurality of terminals included in the joint member of the strap section 100C. Such a configuration allows these types of information to be transmitted and received to and from the main body 200C only with one joint terminal of the joint member 105 of the strap section 100C.

The output unit 160 outputs information other than a sound received from the main body 200C. The output unit 160 may be driving that causes a vibration, for example.

(Main Body)

The main body 200C of the sound collection system 1 according to the present embodiment is provided with the second processing unit 257 capable of transmitting and receiving information to and from the first processing unit 150 of the strap section 100C. Specifically, the second processing unit 257 transmits and receives information to and from the first processing unit 150 via the joint member of the strap section 100C joined to the joint section of the main body 200C. The joint section is a multi-contact plug including a plurality of terminals, and one terminal among the plurality of terminals is configured to be capable of transmitting and receiving a multiplexed signal.

Upon receiving sensor information acquired in the sensor unit 140 of the strap section 100C, the second processing unit 257 executes processing on the basis of the sensor information. Predetermined processing includes, for example, mounting detection processing regarding whether or not an acoustic unit is about to be detached from the user, monitoring processing of monitoring a user's physical condition state, and the like. In the mounting detection processing, in a case where the distance to the user is input as sensor information and when the distance becomes a predetermined value or higher, for example, it is possible to determine that a state in which an acoustic unit is about to be detached from the user has arisen. The mounting detection processing can also be processed on the basis of the user's body temperature. In addition, in the monitoring processing, in a case where the user's heart rate is input as sensor information and when the value becomes a predetermined value or higher, it is possible to determine that an abnormal change in user's physical condition could have occurred. The monitoring processing can also be processed on the basis of the user's body temperature, for example.

In a case where it is necessary to provide feedback to the user as a result of executed processing, such as when an acoustic unit is about to be detached from the user, or when an abnormal change in user's physical condition could have occurred, the second processing unit 257 transmits feedback information to the first processing unit 150. For example, the second processing unit 257 transmits an instruction to vibrate the strap section 100C to the first processing unit 150. In addition, in a case where an abnormal change in user's physical condition could have occurred, a person around the user may be informed. For example, in a case where a speaker is provided as the notification unit 227 of the main body 200C, an alarm may be output. Note that the second processing unit 257 is capable of executing not only processing based on sensor information but also other processing. The second processing unit 257 may transmit and receive information to and from the system control unit 210 or the wireless communication unit 230 according to necessity.

In this manner, in the sound collection system 1 according to the present embodiment, it is possible that information other than a sound can also be transmitted and received between the strap section 100C and the main body 200C, various functions can be achieved.

Note that the above-described example has described a case where sensor information acquired in the sensor unit 140 of the strap section 100C is output to the main body 200C via the first processing unit 150, whilst the present disclosure is not limited to such an example. For example, in a case where the strap section 100C includes a storage unit (not shown.), it may also be possible that information stored in the storage unit can be output to the main body 200C via the first processing unit 150. For example, in a case where personal information that specifies the user of the strap section 100C is stored in the storage unit, by joining the strap section 100C and the main body 200C, the personal information may be transmitted from the strap section 100C to the main body 200C to cause information regarding the employee ID card to be displayed on a panel of the main body 200C on the basis of the personal information.

<4. Use Cases>

Use cases of the sound collection system 1 described above will be described below.

[4.1. Change of Display]

In the sound collection system 1, a sound source acquired in the sound collection unit 110 of the strap section 100 is subjected to sound signal processing in the main body 200, and on this occasion, a sound analysis may be performed in the system control unit 210, for example. Examples of the sound analysis include, from a comment of a user's conversation partner included in a sound source, for example, analyzing a native language of the conversation partner. Accordingly, in a case where the main body 200 is provided with the panel 202 that functions as a display, it is possible to change the language of letters displayed on the panel 202 to the native language of the conversation partner.

For example, as shown on the left side of FIG. 13, it is assumed that an employee ID card image 300D is being displayed on the main body 200. In the employee ID card image 300D, a company name 310D, a department and name 320D, and a user's face picture 330D are displayed. The company name 310D and the department and name 320D are written in Japanese. At this time, in a case where a sound analysis is performed from a comment of a conversation partner included in a sound source acquired by the sound collection unit 110 that a conversation is being made in English, the system control unit 210 changes the employee ID card image 300D displayed on the main body 200 to an employee ID card image 300E in which the company name 310D and the department and name 320D are expressed in English, as shown on the right side of FIG. 13. This allows the conversation partner to easily recognize information described on the employee ID card.

[4.2. Display/Hiding]

In addition, in the sound collection system 1, in a case where the panel of the main body 200 is a display and includes a touch sensor, it is possible to easily operate display/hiding of displayed information on the display. For example, as shown on the left side of FIG. 14, it is assumed that the employee ID card image 300D is displayed on the main body 200. At this time, if the user wears the sound collection system 1 even when the user moves out of the company, personal information is known to others. Therefore, as shown on the left side of FIG. 14, for example, when it is detected that a predetermined motion, for example, a motion of flicking the display with a finger has been performed, the employee ID card image 300D is hidden as shown on the right side of FIG. 14. This allows the user to easily hide information regarding the employee ID card alone in a state where he/she wears the sound collection system 1. Note that, in a case where the user wishes to have the information regarding the employee ID card displayed again, the information may be displayed by performing a predetermined motion, for example, a motion of flicking the display with a finger, similarly to when hiding information on the panel, for example.

Figure 14:
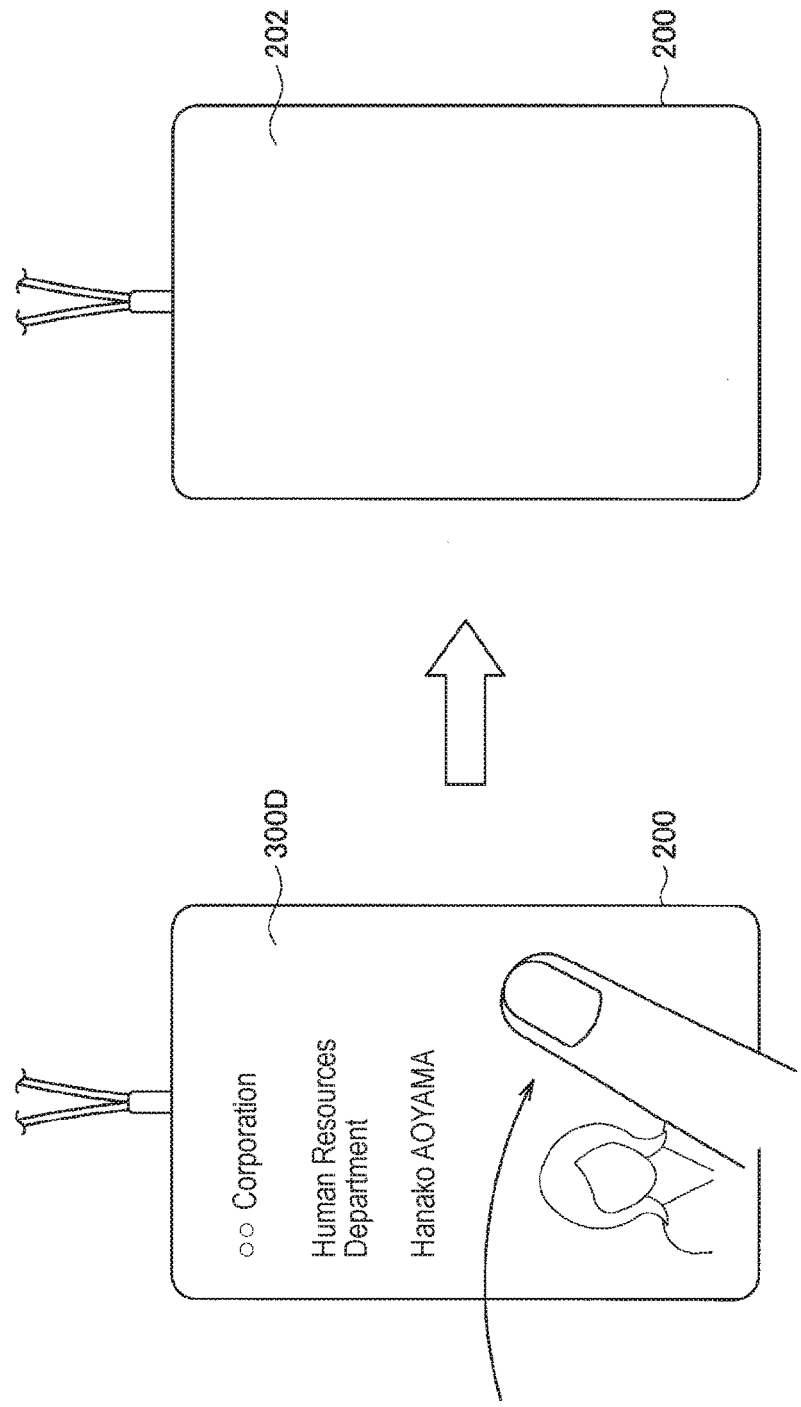
FIG. 14 is an explanatory diagram showing another use case of the sound collection system according to the embodiment.

Note that all pieces of information displayed on the panel are hidden in the example of FIG. 14, whilst the present disclosure is not limited to such an example, but only an area corresponding to a portion flicked with a finger may be hidden, for example.

[4.3. Automatic Display]

In the example of FIG. 14, display and hiding of information on the panel is controlled by a user instruction, whilst it is also possible to provide automatic control. For example, display and hiding of information on the panel can be automatically performed using user's location information. The user's location information can be acquired by a GPS sensor or the like, for example. This sensor information may be acquired by a GPS sensor provided as a sensor unit of the main body 200, or may be acquired by a GPS sensor provided as a sensor unit of the strap section 100. Alternatively, noise included in a sound source acquired by the sound collection unit 110 may be analyzed to specify the user's location. For example, in a case where a train's sound or the like is included in the sound source, it is also possible to determine that the user is located in a train or in a station.

Figure 15:
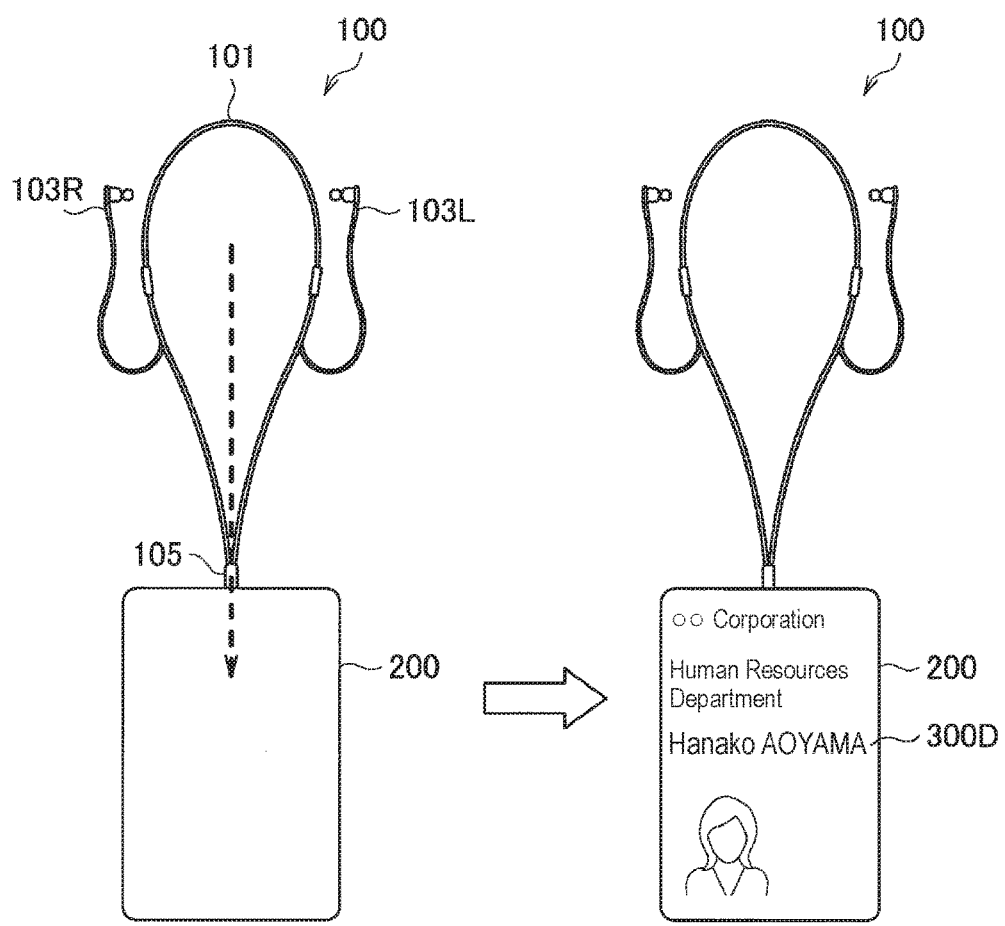
FIG. 15 is an explanatory diagram showing another use case of the sound collection system according to the embodiment.

In the example of the employee ID card, it is assumed that an employee ID card image is displayed while the user is in the office, for example, and when the user is present outside the office, the employee ID card image is hidden. At this time, when the user is present outside the office, nothing is displayed on the main body 200 as shown on the left side of FIG. 15. Then, when it is recognized that the user has entered the office from user's location information, the employee ID card image 300D as shown on the right side of FIG. 15 will be displayed.

In addition, as another example of automatic display, in a case where the strap section 100C includes a storage unit (not shown.), for example, as described in FIG. 12, it may be possible that information stored in the storage unit can be output to the main body 200C via the first processing unit 150. For example, in a case where personal information that specifies the user of the strap section 100C has been recorded in the storage unit, the personal information may be transmitted from the strap section 100C to the main body 200C by joining the strap section 100C and the main body 200C, and on the basis of the personal information, information regarding the employee ID card may be displayed on the panel of the main body 200C.

<5. Hardware Configuration>

Figure 16:
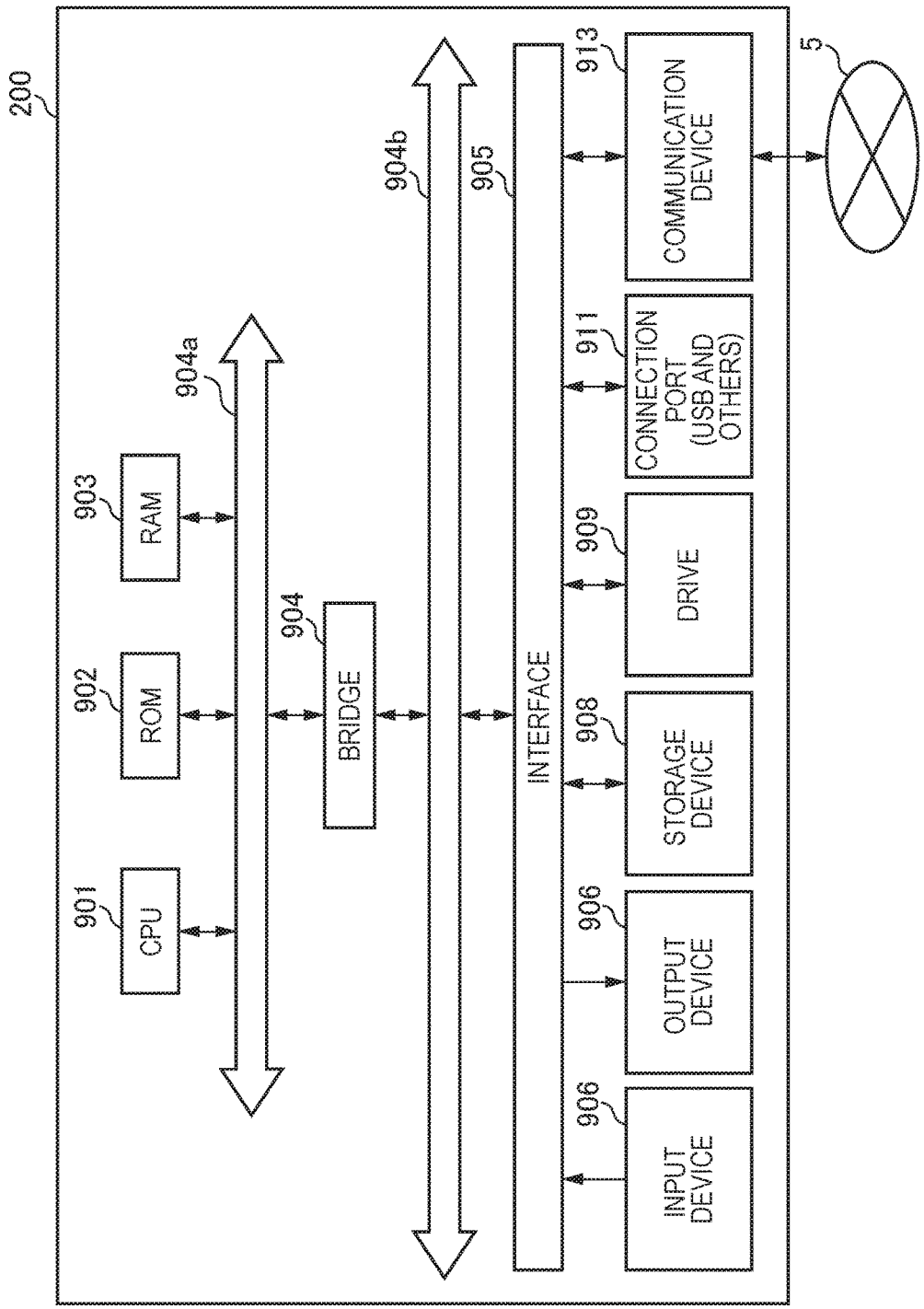
FIG. 16 is a hardware configuration diagram showing a hardware configuration of an information processing device according to the embodiment.

Finally, a hardware configuration example of the main body 200 which is an information processing device of the sound collection system 1 according to the above-described embodiment will be described. FIG. 16 is a hardware configuration diagram showing a hardware configuration of the main body 200 according to the above-described embodiment.

The main body 200 according to the present embodiment can be implemented as a processing device such as a computer, as described above. As illustrated in FIG. 16, the main body 200 includes a central processing unit (CPU) 901, a read only memory (ROM) 902, a random access memory (RAM) 903, and a host bus 904a. In addition, the main body 200 includes a bridge 904, an external bus 904b, an interface 905, an input device 906, an output device 907, a storage device 908, a drive 909, a connection port 911, and a communication device 913.

The CPU 901 functions as an arithmetic processing device and a control device and controls the overall operation in the main body 200 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. These components are interconnected via the host bus 904a formed by a CPU bus or the like.

The host bus 904a is connected to the external bus 904b such as peripheral component interconnect/interface (PCI) bus through the bridge 904. Moreover, the host bus 904a, the bridge 904, and the external bus 904b are not necessarily configured as separate components, and the functions of them may be incorporated into a single bus.

The input device 906 includes input means through which the user can input information, such as a mouse, a keyboard, a touch panel, a button, a microphone, a switch, and a lever, an input control circuit that generates an input signal on the basis of the input by the user and outputs it to the CPU 901, and the like. The output device 907 includes, for example, a display device such as a liquid crystal display (LCD) device, an organic light emitting diode (OLED) device, or a lamp, and a sound output device such as a speaker.

The storage device 908 is an example of the storage unit of the main body 200 and is a device for storing data. The storage device 908 may include a recording medium, a recording device that records data in the recording medium, a readout device that reads out data from the recording medium, a deletion device that deletes data recorded in the recording medium and the like. The storage device 908 drives a solid-state memory, and stores a program executed by the CPU 901 and various kinds of data.

The drive 909 is a reader-writer for a recording medium, and is built in the main body 200 or is externally attached thereto. The drive 909 reads out information recorded in a removable recording medium such as a semiconductor memory being mounted, and outputs the information to the RAM 903.

The connection port 911 is an interface connected to an external device and is a port for connecting an external device that is capable of transmitting data through, in one example, a universal serial bus (USB). Furthermore, the communication device 913 is, in one example, a communication interface formed by a communication device or the like for connecting to a communication network 5. Furthermore, the communication device 913 may be a communication device compatible with Bluetooth (registered trademark), a communication device compatible with a wireless local area network (LAN), a communication device compatible with a wireless USB, or a wired communication device that communicates with wire.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a holding section configured to hold a card that stores personal information; and a main body that is provided with the holding section and connectable to a strap section including a sound collection unit and an acoustic output unit, in which the main body encloses a sound signal processing unit configured to process a sound acquired at least by the sound collection unit and a processing unit configured to execute predetermined processing on a basis of the personal information stored in the card held by the holding section.

(2)

The information processing device according to (1), in which the holding section holds the card such that a surface of the card is exposed.

(3)

The information processing device according to (1), in which the holding section holds the card inserted into an inside of the main body.

(4)

The information processing device according to any one of (1) to (3), in which a display is provided at least on a surface of the main body.

(5)

The information processing device according to (4), in which the display is provided with a touch sensor configured to detect an input by an operating body.

(6)

The information processing device according to any one of (1) to (5), in which the main body has a rectangular plane of a shape substantially identical to the card, and at least at a central portion of one longer side and a central portion of one shorter side of a peripheral part of the rectangular plane, the main body is provided with joint sections to which a joint member of the strap section is to be joined.

(7)

The information processing device according to (6), in which the joint member of the strap section is a multi-contact single-head plug, and the joint sections are configured to be capable of transmitting and receiving a multiplexed signal via one terminal among a plurality of terminals included in the joint member of the strap section.

(8)

The information processing device according to any one of (1) to (7), in which the processing unit sets an acoustic profile that represents a setting of acoustic signal processing by the sound signal processing unit on a basis of the personal information stored in the card, and the sound signal processing unit executes acoustic signal processing on a sound acquired by the sound collection unit on a basis of the acoustic profile set by the processing unit.

(9)

The information processing device according to any one of (1) to (8), in which the sound signal processing unit includes a sound enhancement processing unit configured to, for a sound acquired by the sound collection unit, enhance the sound, and an output switching/synthesizing unit configured to control a sound to be output from the acoustic output unit of the strap section.

(10)

The information processing device according to any one of (1) to (9), in which the sound signal processing unit includes a noise cancellation signal generation unit configured to generate a noise cancellation signal that cancels out noise included in a sound acquired by the sound collection unit.

(11)

The information processing device according to any one of (1) to (10), in which the main body includes a storage unit configured to store a sound acquired by the sound collection unit.

(12)

The information processing device according to any one of (1) to (11), in which the main body includes a wireless communication unit configured to perform near-field wireless communication with an external terminal.

(13)

The information processing device according to any one of (1) to (12), in which the main body includes one or more sensors configured to acquire information concerning a user who holds the main body.

(14)

The information processing device according to any one of (1) to (13), in which the processing unit recognizes a language of a sound acquired by the sound collection unit, and changes languages of displayed information on a display provided at least on a surface of the main body in accordance with the recognized language.

(15)

The information processing device according to any one of (1) to (14), in which the processing unit hides displayed information on a display provided at least on a surface of the main body in accordance with a type of noise included in a sound acquired by the sound collection unit.

(16)

The information processing device according to any one of (1) to (15), in which the card is an employee ID card.

(17)

An information processing system including:

a strap section including a sound collection unit and an acoustic output unit; and an information processing device including a holding section configured to hold a card that stores personal information and a main body being provided with the holding section and connectable to the strap section, in which the main body of the information processing device encloses a sound signal processing unit configured to process a sound acquired at least by the sound collection unit and a processing unit configured to execute predetermined processing on a basis of the personal information stored in the card held by the holding section.

(18)

The information processing system according to (17), in which the strap section includes one or more sensors configured to acquire information concerning a user who wears the strap section and a first processing unit configured to output detected information acquired by the sensors to the information processing device and process information input from the information processing device, in which the information processing device includes a second processing unit configured to execute predetermined processing on a basis of the detected information input from the first processing unit of the strap section.

(19)

An information processing system including:

a strap section that is capable of outputting authentication information that can specify a user and includes a sound collection unit and an acoustic output unit; and an information processing device including a main body that is connectable to the strap section, in which the main body of the information processing device encloses a sound signal processing unit configured to process a sound acquired at least by the sound collection unit and a processing unit configured to execute predetermined processing on a basis of the authentication information output from the strap section.

(20)

The information processing system according to (19), in which the strap section includes a biometric information sensor configured to acquire biometric information of a user, the biometric information sensor outputs the acquired biometric information to the information processing device as the authentication information, and the processing unit of the information processing device specifies a user on a basis of the biometric information, and displays information concerning the specified user on a display unit.

REFERENCE SIGNS LIST 1 sound collection system
100, 100A, 100C, 100T strap section
101 strap
103R, 103L acoustic unit
105 joint member
105a attachment member
107 joint terminal
107a cable
110 sound collection unit
130 sound output unit
140 sensor unit
150 first processing unit
160 output unit
200, 200A, 200B, 200C main body
201 casing
202 panel
203 enclosure
204a, 204b attachment hole
205a, 205b button
205c switch
206, 206a, 206b, 206c, 206d joint section
207 camera
210 system control unit
221 nonvolatile storage device
223 physical switch
225 connector
227 notification unit
230 wireless communication unit
240 acoustic-electric conversion unit
250 sound signal processing unit
251 sound enhancement processing unit
253 output switching/synthesizing unit
255 noise cancellation signal generation unit
257 second processing unit
260 electric-acoustic conversion unit
270 sensor unit
280 display unit
290 power source
300 RFID card
400 external device

The invention claimed is:

1. An information processing device, comprising:
a holding section configured to hold a card that stores personal user information;
a main body that includes the holding section, wherein the main body is connectable to a strap section that includes a sound collection unit and an acoustic output unit;
a display screen on a surface of the main body, wherein the display screen is configured to display the personal user information;
a sound signal processing unit configured to process sound acquired by the sound collection unit; and
a control unit configured to:
execute a specific process based on the personal user information; and
hide the personal user information displayed on the display screen based on analysis of the sound acquired by the sound collection unit,
wherein the main body encloses the sound signal processing unit and the control unit.

2. The information processing device according to claim 1, wherein the holding section is further configured to hold the card such that a surface of the card is visible.

3. The information processing device according to claim 1, wherein the holding section is further configured to hold the card such that the card is inside of the main body.

4. The information processing device according to claim 1, wherein the display screen comprises a touch sensor configured to detect a user input.

5. The information processing device according to claim 1, wherein
the main body has a rectangular plane of a shape substantially identical to a shape of the card, and
the main body includes a plurality of joint sections connectable to a joint member of the strap section at one of:
a central portion of one longer side of a peripheral part of the rectangular plane, or
a central portion of one shorter side of the peripheral part of the rectangular plane.

6. The information processing device according to claim 5, wherein
the joint member of the strap section is a multi-contact single-head plug, and
the plurality of joint sections are configured to:
transmit a multiplexed signal via one of a plurality of terminals in the joint member; and
receive the multiplexed signal via one of the plurality of terminals.

7. The information processing device according to claim 1, wherein
the control unit is further configured to set, based on the personal user information, an acoustic profile that represents setting information of an acoustic signal processing operation, and
the sound signal processing unit is further configured to execute the acoustic signal processing operation on the sound based on the acoustic profile.

8. The information processing device according to claim 1, wherein
the sound signal processing unit includes:
a sound enhancement processing unit configured to enhance the sound; and
an output switching/synthesizing unit configured to control an output sound from the acoustic output unit.

9. The information processing device according to claim 1, wherein the sound signal processing unit includes a noise cancellation signal generation unit configured to generate a noise cancellation signal that cancels out noise in the sound.

10. The information processing device according to claim 1, wherein the main body includes a storage unit configured to store the sound.

11. The information processing device according to claim 1, wherein the main body includes a wireless communication unit configured to communicate with an external terminal via near-field wireless communication.

12. The information processing device according to claim 1, wherein the main body further includes at least one sensor configured to acquire first user information.

13. The information processing device according to claim 1, wherein the control unit is further configured to:
recognize a language associated with the sound, and
change language of the personal user information on the display screen based on the recognized language.

14. The information processing device according to claim 1, wherein the card is an employee identity (ID) card.

15. The information processing device according to claim 1, wherein the control unit is further configured to display the hidden personal user information based on user location information.

16. An information processing system, comprising:
a strap section including a sound collection unit and an acoustic output unit, wherein the sound collection unit is configured to acquire sound;
an information processing device including:
a holding section configured to hold a card that stores personal user information;
a main body that includes the holding section, wherein the main body is connectable to the strap section;
a display screen on a surface of the main body, wherein the display screen is configured to display the personal user information;
a sound signal processing unit configured to process the sound acquired by the sound collection unit; and
a control unit configured to:
execute a first specific process based on the personal user information; and
hide the personal user information displayed on the display screen based on analysis of the sound acquired by the sound collection unit,
wherein the main body encloses the sound signal processing unit and the control unit.

17. The information processing system according to claim 16, wherein
the strap section is user wearable,
the strap section further includes at least one sensor and a first processing unit,
the at least one sensor is configured to acquire first user information, and
the first processing unit is configured to:
output the first user information to the information processing device; and
process input information input from the information processing device, and
the information processing device further includes a second processing unit configured to execute a second specific process based on the first user information.

18. An information processing system, comprising:
a strap section configured to output authentication information that specifies a user,
wherein the strap section includes a sound collection unit and an acoustic output unit, wherein the sound collection unit configured to acquire sound; and
an information processing device including:
a main body connectable to the strap section;
a display screen on a surface of the main body, wherein the display screen is configured to display personal user information;
a sound signal processing unit configured to process the sound acquired by the sound collection unit; and
a control unit configured to:
execute a specific process based on the authentication information; and
hide the personal user information displayed on the display screen based on analysis of the sound acquired by the sound collection unit, and
wherein the main body encloses the sound signal processing unit and the control unit.

19. The information processing system according to claim 18, wherein
the strap section includes a biometric information sensor configured to acquire user biometric information,
the biometric information sensor is configured to output the user biometric information to the information processing device as the authentication information, and
the control unit is further configured to:
specify the user based on the user biometric information; and
display the personal user information of the user on the display screen based on the specified user.

* * * * *